US012745887B2

(12) United States Patent
Royale et al.

(10) Patent No.: US 12,745,887 B2
(45) Date of Patent: Sep. 29, 2026

(54) AIR/LIQUID SEPARATION SYSTEM FOR AN EXTRACTION CLEANER

(71) Applicant: BISSELL Inc., Grand Rapids, MI (US)

(72) Inventors: Victoria J. Royale, Comstock Park, MI (US); Mitchell P. Sloboda, Sparta, MI (US)

(73) Assignee: BISSELL Inc., Grand Rapids, MI (US)

( * ) Notice: Subject to any disclaimer, the term of this patent is extended or adjusted under 35 U.S.C. 154(b) by 467 days.

(21) Appl. No.: 18/225,744

(22) Filed: Jul. 25, 2023

(65) Prior Publication Data

US 2024/0023782 A1 Jan. 25, 2024

Related U.S. Application Data

(60) Provisional application No. 63/369,291, filed on Jul. 25, 2022.

(51) Int. Cl.

| | |
|---|---|
| ***A47L 11/40*** | (2006.01) |
| ***A47L 11/30*** | (2006.01) |
| ***A47L 11/34*** | (2006.01) |
| ***B01D 45/02*** | (2006.01) |

(52) U.S. Cl.

CPC ........... *A47L 11/4027* (2013.01); *A47L 11/30* (2013.01); *A47L 11/34* (2013.01); *A47L 11/4019* (2013.01); *B01D 45/02* (2013.01)

(58) Field of Classification Search

CPC .... A47L 11/4019; A47L 11/30; A47L 7/0028; A47L 7/0023; A47L 11/4027; A47L 11/34; B01D 45/02

See application file for complete search history.

(56) References Cited

U.S. PATENT DOCUMENTS

| | | | |
|---|---|---|---|
| 4,934,017 | A | 6/1990 | Kent |
| 5,301,386 | A | 4/1994 | Thomas et al. |
| 5,309,600 | A | 5/1994 | Weaver et al. |
| 5,363,535 | A | 11/1994 | Rench et al. |
| 5,406,673 | A | 4/1995 | Bradd et al. |
| 5,715,566 | A | 2/1998 | Weaver et al. |
| 5,761,763 | A | 6/1998 | McAllise et al. |

(Continued)

FOREIGN PATENT DOCUMENTS

| | | | |
|---|---|---|---|
| CN | 1806742 | A | 7/2006 |
| CN | 106235970 | A | 12/2016 |

(Continued)

*Primary Examiner* — Andrew A Horton

(74) *Attorney, Agent, or Firm* — Price Heneveld LLP

(57) ABSTRACT

An air/liquid separation system for an extraction cleaner has a recovery tank assembly that includes a recovery tank, an inlet stack for receiving the working air stream with extracted liquid and debris entrained therein, an outlet stack for expelling air separated from the working air stream, and a lid assembly. A float is disposed adjacent to a curvilinear exterior side wall of a recovery tank, and the inlet stack and outlet stack are disposed transversely side-by-side in a tank chamber with the outlet stack between the float and the inlet stack. A bottom of the lid assembly defines an open bottom cavity within the tank chamber and above an outlet of the inlet stack. A lower surface of the lid assembly at the open bottom cavity inclines upward and outward from above the outlet of the inlet stack to an outermost side wall of the lid assembly.

20 Claims, 14 Drawing Sheets

(56) References Cited

U.S. PATENT DOCUMENTS

| | | | |
|---|---|---|---|
| 5,896,617 | A | 4/1999 | Kasen et al. |
| 5,933,912 | A | 8/1999 | Karr et al. |
| 6,094,775 | A | 8/2000 | Behmer |
| 6,131,237 | A | 10/2000 | Kasper et al. |
| 6,145,159 | A | 11/2000 | Zahuranec et al. |
| 6,588,055 | B2 | 7/2003 | Bair et al. |
| 6,725,498 | B2 | 4/2004 | Symensma et al. |
| 6,869,065 | B1 | 3/2005 | Lin |
| 6,961,975 | B2 | 11/2005 | Park et al. |
| 7,073,226 | B1 | 7/2006 | Lenkiewicz et al. |
| 7,222,389 | B2 | 5/2007 | Morgan et al. |
| 7,228,589 | B2 | 6/2007 | Miner et al. |
| 7,234,197 | B2 | 6/2007 | Tran |
| 7,360,274 | B2 | 4/2008 | Park et al. |
| 7,377,007 | B2 | 5/2008 | Best |
| 7,377,008 | B2 | 5/2008 | Park et al. |
| 7,600,291 | B2 | 10/2009 | Choi |
| 7,784,148 | B2 | 8/2010 | Lenkiewicz et al. |
| 7,793,385 | B2 | 9/2010 | Huffman |
| 7,966,690 | B2 | 6/2011 | Lenkiewicz |
| 8,291,546 | B2 | 10/2012 | Louis et al. |
| 8,381,352 | B2 | 2/2013 | Huffman et al. |
| 8,549,697 | B1 | 10/2013 | Moyher, Jr. et al. |
| 9,015,898 | B2 | 4/2015 | Nguyen |
| 9,107,558 | B2 | 8/2015 | Lenkiewicz et al. |
| 9,138,119 | B1 | 9/2015 | Bantum |
| 9,295,365 | B2 | 3/2016 | Huffman et al. |
| 9,380,921 | B2 | 7/2016 | Nguyen et al. |
| 9,427,128 | B2 | 8/2016 | DeJonge et al. |
| 9,615,703 | B2 | 4/2017 | Moyher, Jr. et al. |
| 9,629,513 | B2 | 4/2017 | Hill et al. |
| 9,717,389 | B2 | 8/2017 | Johnson et al. |
| 10,188,253 | B2 | 1/2019 | Miller |
| 10,376,124 | B2 | 8/2019 | McDowell et al. |
| 10,602,903 | B2 | 3/2020 | Johnson et al. |
| 10,610,076 | B2 | 4/2020 | Chavana, Jr. et al. |
| 10,674,881 | B2 | 6/2020 | Chavana, Jr. et al. |
| 10,966,586 | B2 | 4/2021 | Luyckx et al. |
| 11,089,933 | B2 | 8/2021 | Xia et al. |
| 11,089,935 | B2 | 8/2021 | Nguyen |
| 11,096,544 | B2 | 8/2021 | Nguyen et al. |
| 11,259,679 | B2 | 3/2022 | Royale |
| 11,284,767 | B2 | 3/2022 | Nguyen |
| 11,484,171 | B2 | 11/2022 | Bloom et al. |
| 11,523,725 | B2 | 12/2022 | Quintero et al. |
| 11,559,039 | B2 | 1/2023 | Hoffmann et al. |
| 11,612,293 | B2 | 3/2023 | Rukavina |
| 11,666,196 | B2 | 6/2023 | Luyckx et al. |
| 11,759,072 | B2 | 9/2023 | Morphey et al. |
| 11,937,750 | B2 | 3/2024 | Rukavina |
| 12,096,905 | B2 | 9/2024 | Gray et al. |
| 2002/0166198 | A1 | 11/2002 | McGill et al. |
| 2002/0184731 | A1 | 12/2002 | Moine et al. |
| 2004/0206238 | A1 | 10/2004 | Allgeier |
| 2006/0191099 | A1 | 8/2006 | Fry et al. |
| 2011/0023262 | A1 | 2/2011 | Conrad |
| 2013/0318741 | A1* | 12/2013 | Moyher, Jr. ........ A47L 11/4083 15/327.1 |
| 2020/0060496 | A1 | 2/2020 | Dawson et al. |
| 2022/0218167 | A1 | 7/2022 | Lenkiewicz et al. |
| 2023/0015738 | A1 | 1/2023 | Boles et al. |
| 2023/0210333 | A1 | 7/2023 | Fordahl et al. |
| 2023/0284857 | A1 | 9/2023 | Nguyen et al. |
| 2023/0363612 | A1 | 11/2023 | DeJonge et al. |
| 2024/0041280 | A1 | 2/2024 | Gray et al. |
| 2024/0324836 | A1 | 10/2024 | Craig et al. |

FOREIGN PATENT DOCUMENTS

| | | | |
|---|---|---|---|
| CN | 214160679 | U | 9/2021 |
| CN | 214437809 | U | 10/2021 |
| CN | 215348750 | U | 12/2021 |
| CN | 114081405 | A | 2/2022 |
| CN | 216147984 | U | 4/2022 |
| CN | 216776910 | U | 6/2022 |
| CN | 216876265 | U | 7/2022 |
| CN | 114287850 | B | 12/2022 |
| CN | 117442119 | A | 1/2024 |
| EP | 3808243 | A1 | 4/2021 |
| EP | 3482668 | B1 | 7/2022 |
| GB | 2334668 | A | 1/1999 |
| GB | 2407967 | A | 5/2005 |
| GB | 2424361 | A | 9/2006 |
| GB | 2445315 | A | 2/2008 |
| GB | 2458220 | A1 | 9/2009 |
| GB | 2613665 | A | 6/2023 |
| WO | 2009042663 | A1 | 4/2009 |
| WO | 2022119817 | A1 | 6/2022 |
| WO | 2022232235 | A1 | 11/2022 |
| WO | 2023099907 | A1 | 6/2023 |
| WO | 2023099908 | A1 | 6/2023 |
| WO | 2023099909 | A1 | 6/2023 |
| WO | 2023099910 | A1 | 6/2023 |
| WO | 2023099911 | A1 | 6/2023 |
| WO | 2023099912 | A1 | 6/2023 |
| WO | 2023099913 | A1 | 6/2023 |

* cited by examiner

AIR/LIQUID SEPARATION SYSTEM FOR AN EXTRACTION CLEANER

CROSS-REFERENCE TO RELATED APPLICATION

This application claims priority to and the benefit under 35 U.S.C. § 119(e) of U.S. Provisional Application No. 63/369,291, filed on Jul. 25, 2022, entitled "AIR/LIQUID SEPARATION SYSTEM FOR AN EXTRACTION CLEANER," the disclosure of which is hereby incorporated herein by reference in its entirety.

TECHNICAL FIELD

The present disclosure generally relates to an air/liquid separation system for an extraction cleaner.

BACKGROUND

Extraction cleaners are utilized for cleaning carpets, upholstery, furniture, and other surfaces. Extraction cleaners extract dirt from a surface using a fluid delivery system and a recovery system to suction debris and/or fluid from a surface. The fluid delivery system supplies cleaning fluid, such as water, cleaning solution, or a mixture of both, to a surface to be cleaned from a supply tank onboard the extraction cleaner. The recovery system utilizes an onboard suction source that recovers the fluid applied by the fluid delivery system along with dirt and debris, typically drawing the recovered dirt and fluid through a nozzle of a cleaning tool, through a hose fluidly coupled to the suction source, and into a recovery storage tank that is also onboard the extraction cleaner. The recovery system may include an air/liquid separation system operable to substantially separate fluid and debris from a working air stream prior to the working air stream exiting the recovery tank and passing through the suction source, and then exhausting from the extraction cleaner.

BRIEF SUMMARY

An air/liquid separation system for an extraction cleaner is provided. The air/liquid separation system disclosed herein includes a recovery system with features configured to utilize a relatively tight packaging space to efficiently separate air from an incoming working air stream that is a mixture of recovered fluid, debris, and air.

For example, an air/liquid separation system within the scope of the disclosure may have a recovery tank assembly that includes a recovery tank, an inlet stack for receiving the working air stream with extracted liquid and debris entrained therein, an outlet stack for expelling air separated from the working air stream, and a lid assembly. The recovery tank may define a tank chamber with a top opening, and may have a bottom wall, a curvilinear exterior side wall that extends upward from the bottom wall to the top opening, and a relatively planar interior side wall extending upward from the bottom wall to the top opening. The relatively planar interior side wall may be connected to the curvilinear exterior side wall. The relatively planar interior side wall and the curvilinear exterior side wall may together surround the tank chamber and define the top opening. The bottom wall may have an inlet opening and an outlet opening. The inlet opening may receive the working air stream. The inlet stack may extend upward from the inlet opening and the outlet stack may extend upward from the outlet opening. The lid assembly may define a lid chamber having a first lid chamber opening in selective fluid communication with the tank chamber and serving as a tank chamber air outlet, and a second lid chamber opening at an inlet of the outlet stack. An outer perimeter of the lid assembly may follow and seal to the curvilinear exterior side wall and to the relatively planar interior side wall at the top of the recovery tank to enclose the top opening of the recovery tank. A float may be disposed within the tank chamber and may be operatively attached to and vertically translatable relative to the lid assembly to close the first lid chamber opening when liquid in the tank chamber reaches a predetermined level. The float may be disposed adjacent to the curvilinear exterior side wall, and the inlet stack and outlet stack may be disposed transversely side-by-side in the tank chamber with the outlet stack between the float and the inlet stack. This packaging arrangement fully utilizes the shape and volume of the recovery tank given the confines of the curvilinear exterior side wall. For example, the mechanical layout of components within a housing of the extraction cleaner to which the recovery tank mounts and to which the inlet and outlet openings fluidly communicate may necessitate the inlet and outlet stacks being nearer to center of the recovery tank, which is better accomplished by the side-by-side arrangement rather than an arrangement in which the inlet and outlet stacks proceed from the relatively planar interior side wall to the curvilinear exterior side wall. Additionally, the transversely side-by-side arrangement in the recovery tank chamber with the outlet stack between the float and the inlet stack may afford more space between the side walls and the inlet and outlet stacks so that wiping the insides of the recovery tank after use is easier for a user to accomplish.

In another example, an air/liquid separation system within the scope of the disclosure may include a recovery tank assembly including a recovery tank, an inlet stack for receiving the working air stream with extracted liquid and debris entrained therein, an outlet stack for expelling air separated from the working air stream, and a lid assembly. The recovery tank may define a tank chamber with a top opening, the recovery tank having a bottom wall, and a plurality of side walls extending upward from the bottom wall to the top opening and defining the top opening. The lid assembly may be configured to sealingly close the top opening. The bottom wall may have an inlet opening for receiving the working air stream and an outlet opening. The inlet stack may extend upward from the inlet opening and the outlet stack may extend upward from the outlet opening. The lid assembly may define a lid chamber having a first lid chamber opening in selective fluid communication with the tank chamber and serving as a tank chamber air outlet, and a second lid chamber opening at an inlet of the outlet stack. A bottom of the lid assembly may define an open bottom cavity within the tank chamber and above an outlet of the inlet stack. A lower surface of the lid assembly at the open bottom cavity may incline upward and outward from above the outlet of the inlet stack to an outermost side wall of the lid assembly to deflect fluid and dirt entrained in the working air stream away from the outlet of the inlet stack. By fully utilizing the lower side of the lid assembly in this manner, the liquid in the incoming working air stream may be sufficiently slowed so that air may separate therefrom without excessive splash. The spacing of the lower surface above the outlet of the inlet stack and the shape of the lower surface are configured to influence the direction of incoming flow within the recovery tank without becoming too restrictive and without increasing the speed of flow so that it becomes uncontrollable. The lower surface configured as described herein guides the liquid downward in a more efficient, controllable, and predictable manner.

The above features and advantages and other features and advantages of the present teachings are readily apparent from the following detailed description of the modes for carrying out the present teachings when taken in connection with the accompanying drawings. It should be understood that even though in the following Figures embodiments may be separately described, single features thereof may be combined to additional embodiments.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Figure 1:
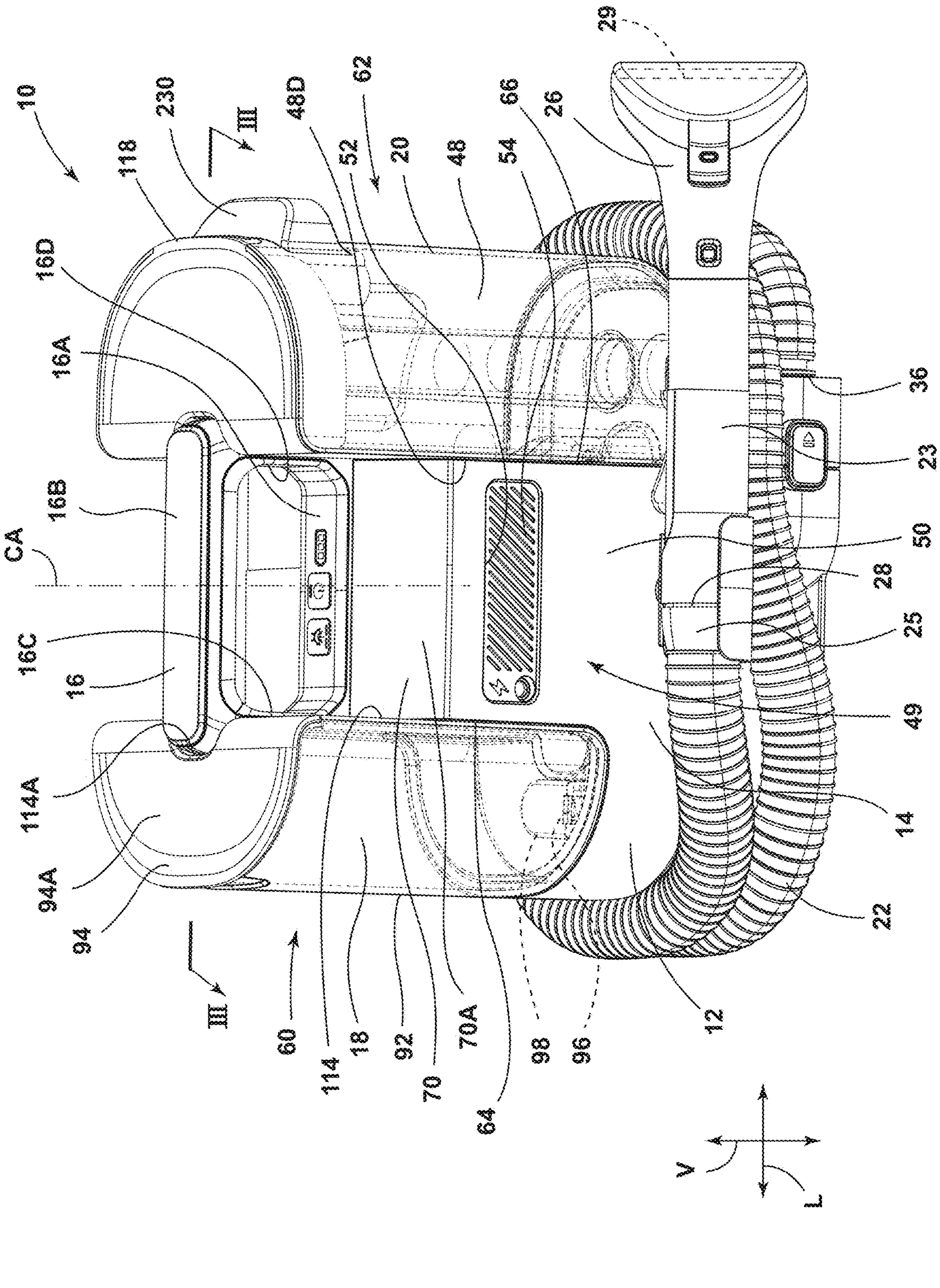
FIG. 1 is a rear perspective view of an extraction cleaner showing a base with a housing and a handle, a supply tank assembly, a recovery tank assembly, and a suction hose wrapped around the housing.

For purposes of description related to the figures, the terms "upper," "lower," "right," "left," "rear," "front," "vertical," "horizontal," "inner," "outer," and derivatives thereof shall relate to the extraction cleaner 10 as oriented in FIG. 1 from the perspective of a user facing the extraction cleaner 10 in FIG. 1, which defines a rear of the extraction cleaner 10.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
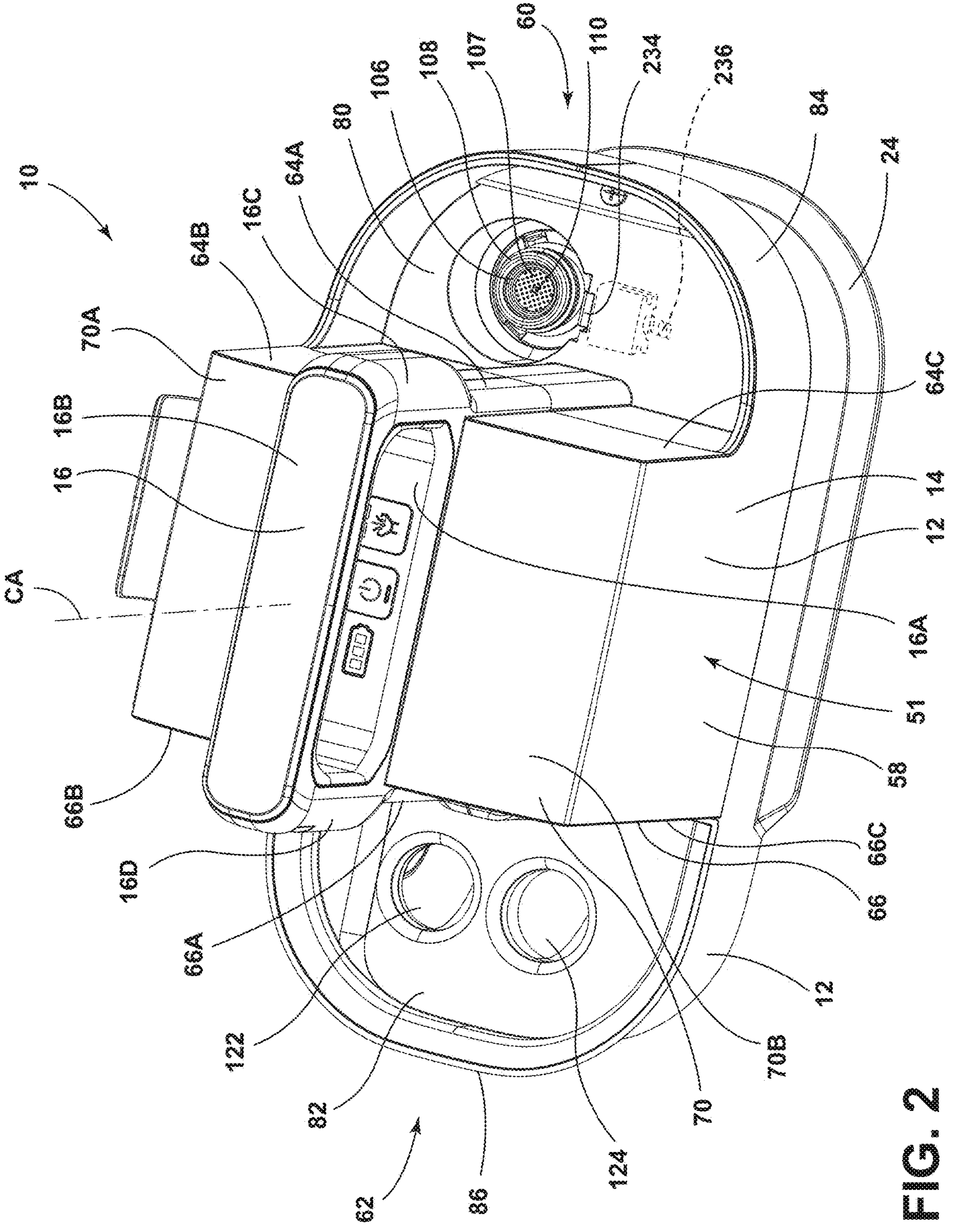
FIG. 2 is a top perspective view of the extraction cleaner with the supply tank assembly removed, the recovery tank assembly removed, the suction hose removed, and showing a supply tank seat and a recovery tank seat of the base.
Figure 3:
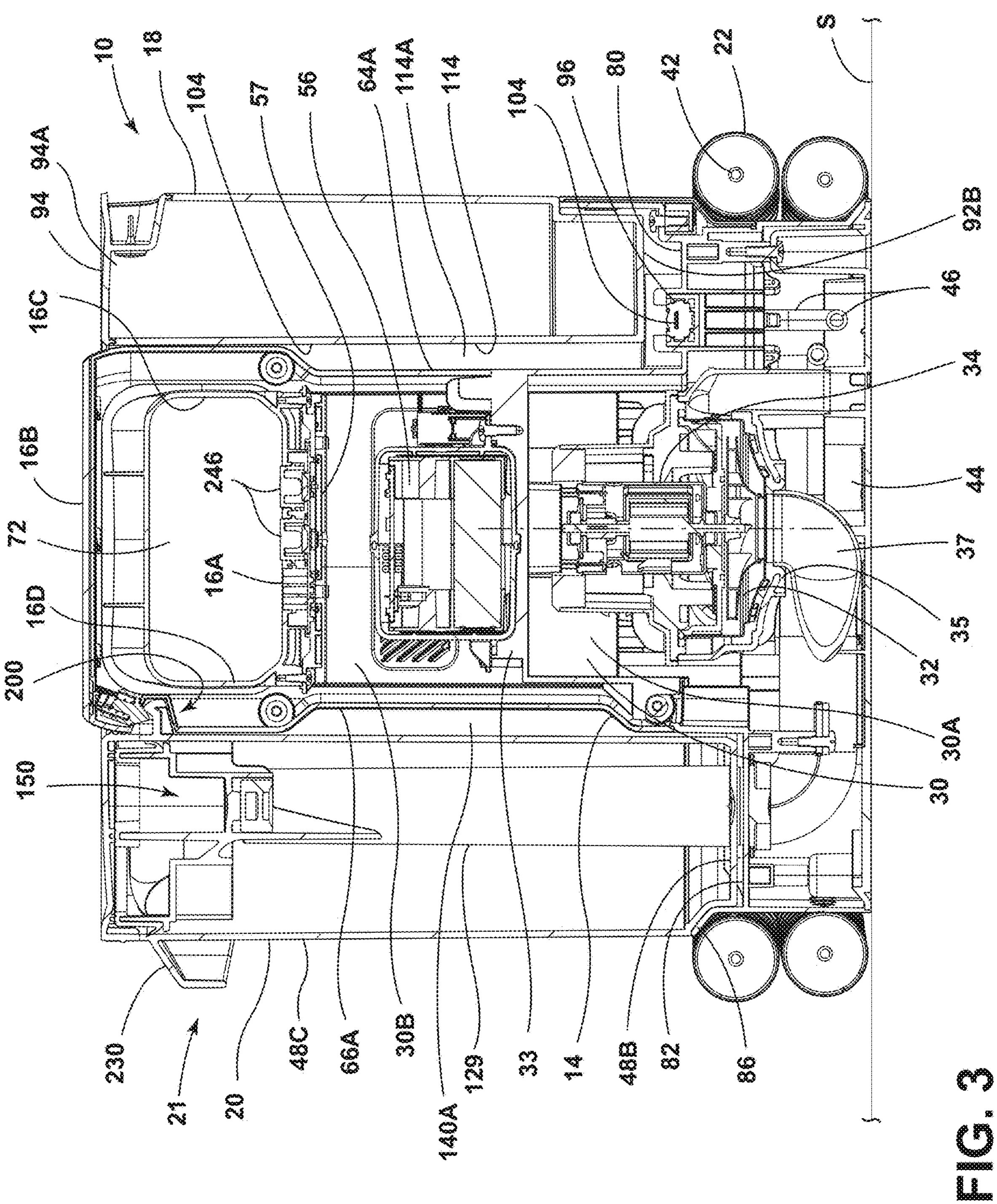
FIG. 3 is a cross-sectional view of the extraction cleaner taken at lines III-III in FIG. 1.

With reference to FIGS. 1-3, the present disclosure generally relates to an extraction cleaner 10 and various aspects thereof for improved performance, compactness, ease of use, and other benefits. The extraction cleaner 10 includes a base 12 that has a housing 14 and a handle 16 extending upward from the housing 14. As further discussed herein, a supply tank assembly 18 and a recovery tank assembly 20 are both seated on the base 12 and fit within with both the housing 14 and the handle 16. A suction hose 22 is shown wrapped around a lower skirt 24 (see FIG. 2) of the base 12. A cleaning tool 26 may be in fluid communication with an inlet 28 of the suction hose 22, such as by securing the cleaning tool 26 to a fluid conduit, referred to herein as a wand 23, connected to a hose connector 25 at the inlet 28. The cleaning tool 26 includes a suction nozzle 29 and may include agitators, such as but not limited to bristles or nubs. In a non-limiting example, a fluid source, such as a spray nozzle may be disposed on an underside of the cleaning tool 26 for selectively dispensing cleaning fluid on a surface S to be cleaned (see FIG. 3), e.g., by depression of a trigger that may be disposed on an underside of the wand 23. An exemplary spray nozzle is shown and described in Applicant's co-pending application U.S. patent application Ser. No. 18/347,677, now U.S. Pat. No. 12,653,366, entitled "Extraction Cleaner," filed Jul. 6, 2023, the contents of which are incorporated herein by reference in their entirety.

The housing 14 defines an internal cavity 30 (shown in FIG. 3), and includes internal walls 33 that serve as a motor housing. The internal walls 33 divide the internal cavity 30 into a lower cavity portion 30A and an upper cavity portion 30B. The lower cavity portion 30A houses a suction source 32, such as a motor and impeller assembly positioned therein. The motor and impeller assembly includes a suction motor 34 and an impeller 35. The upper cavity portion 30B houses a battery pack 56 and a printed circuit board assembly (PCBA) 57. The motor and impeller assembly is disposed in the internal cavity 30 between a supply tank seat 80 and a recovery tank seat 82 of the housing 14 discussed herein. A user interface 246 is disposed at an exterior of a bottom portion 16A of the handle 16 and is operatively connected to the PCBA 57. The user interface 246 may include a plurality of depressible buttons or switches or other components that enable a user to control the operation of the extraction cleaner 10, such as by powering the extraction cleaner 10 on or off, selecting operating modes, etc.

Referring to FIGS. 1 and 3, an outlet 36 of the suction hose 22 is in fluid communication with the suction source 32 of FIG. 3 and with the recovery tank assembly 20 via one or more conduits 37 disposed in the internal cavity 30. The suction source 32 is in fluid communication with the suction nozzle 29 of the cleaning tool 26 through the conduits 37, the suction hose 22, and the wand 23, for generating a working air stream. The recovery tank assembly 20 separates and collects fluid and debris from the working airstream for later disposal as described herein.

The supply tank assembly 18 is in fluid communication with a spray nozzle of the cleaning tool 26 via a fluid delivery line 42 that extends internally within the suction hose 22 (see FIG. 3). Pressurized fluid is delivered through the fluid delivery line 42 from the supply tank assembly 18 via a fluid pump 44 disposed in the internal cavity 30. The fluid pump 44 is in fluid communication with the supply tank assembly 18 via a fluid line 46 (shown in cross-section in FIG. 3). During operation, the extraction cleaner 10 draws in the fluid and debris-laden working airstream through the suction nozzle 29 and into a recovery tank 48 of the downstream recovery tank assembly 20 where the fluid and debris are substantially separated from the working airstream. The working airstream then exits the recovery tank assembly 20 and passes through the motor and impeller assembly prior to being exhausted from the extraction cleaner 10. The recovery tank 48 can be periodically emptied of collected fluid and debris by removing the recovery tank assembly 20 from the base 12, and removing a lid assembly 118 of the recovery tank assembly 20.

In FIGS. 1 and 2, the supply tank assembly 18 and the recovery tank assembly 20 are shown seated on the base 12. The suction hose 22 is shown wrapped around the base 12. The suction hose 22 can be unwound from the base 12 and the suction nozzle 29 of the cleaning tool 26 placed adjacent to the surface S, as shown in FIG. 3 for use in cleaning the surface S. The surface S may be, for example, any type of flooring, including soft surfaces, such as carpet and rugs, upholstered furniture, and hard surfaces, such as tile, wood, vinyl, and laminate surfaces. However, the aspects disclosed herein may be implemented on other types and configurations of cleaners within the scope of the disclosure.

With reference again to FIGS. 1 and 2, a rear portion 49 of the extraction cleaner 10 is illustrated. A rear wall 50 of the housing 14 is at the rear 49 and has an air inlet 52 shown partially covered by an inlet grill 54. Ambient air is drawn in through the air inlet 52 for cooling the battery pack 56 shown in FIG. 3. The front 51 of the extraction cleaner 10 is opposite from the rear 49 and is shown in FIG. 2. It should be appreciated that the front 51 and the rear 49 are defined as such for purposes of discussion only. A front wall 58 of the housing 14 is shown at the front 51. The rear wall 50 extends parallel to the front wall 58. A first side 60 of the extraction cleaner 10 is at the left side in FIG. 1 and a second side 62 of the extraction cleaner 10 is at the right side in FIG. 1. A vertical axis V in FIG. 1 indicates an upward direction (upward arrowhead) and a downward direction (downward arrowhead). A lateral axis L indicates a laterally-outward direction (the arrowhead to the left on the lateral axis L, also referred to as outward), and a laterally-inward direction (the arrowhead to the right on the lateral axis L, also referred to as inward). An inner or internal component or surface will be closer to a vertical center axis CA of the extraction cleaner 10 along the lateral axis L than will an outer or external component or surface.

The housing 14 includes a first side wall 64 that extends from the front wall 58 to the rear wall 50 and is at the first side 60 relative to the center axis CA (see, e.g., FIG. 2). The housing 14 also includes a second side wall 66 that also extends from the front wall 58 to the rear wall 50 and is closer to the second side 62 relative to the center axis CA.

The first side wall 64 extends parallel to the second side wall 66. The first side wall 64 forms a protruding vertical column 64A between a front planar portion 64C and a rear planar portion 64B of the first side wall 64. The second side wall 66 also forms a protruding vertical column 66A between a front planar portion 66C and a rear planar portion 66B of the second side wall 66.

A top wall 70 of the housing 14 includes a rear top wall portion 70A that extends forward from the rear wall 50 between the first side wall 64 and the second side wall 66 to a bottom portion 16A of the handle 16 as best shown in FIGS. 1 and 2. The top wall 70 of the housing 14 also includes a front top wall portion 70B that extends rearward from the front wall 58 between the first side wall 64 and the second side wall 66 to the bottom portion 16A of the handle 16 as shown in FIG. 2. The top wall 70 and the bottom portion 16A of the handle 16 extend over the upper cavity portion 30B of the internal cavity 30 shown in FIG. 3. The handle 16 extends above the top wall 70.

As shown in FIGS. 1-3, the handle 16 includes a grip portion 16B, a first leg portion 16C extending from the first side wall 64 to the grip portion 16B, and a second leg portion 16D extending from the second side wall 66 to the grip portion 16B. The bottom portion 16A, the grip portion 16B, and the leg portions 16C, 16D together define an opening 72, best shown in FIG. 3, through which fingers of a hand can extend when the hand is gripping the grip portion 16B to carry the extraction cleaner 10.

The first leg portion 16C is continuous with and extends upward from the protruding vertical column 64A of the first side wall 64 as best shown in FIG. 3. The second leg portion 16D is continuous with and extends upward from the protruding vertical column 66A of the second side wall 66.

FIG. 2 shows the supply tank seat 80 and the recovery tank seat 82 of the base 12. The supply tank seat 80 is adjacent to the first side wall 64. The housing 14 includes a first lower side wall 84 that is an arcuate, vertically-extending wall that wraps around the supply tank seat 80 from the front wall 58 to the rear wall 50, partially surrounding the supply tank seat 80 so that it is enclosed from the first side 60 and open only from above. The housing 14 forms a lower rim 86 that wraps around the recovery tank seat 82 from the front wall 58 to the rear wall 50.

FIGS. 1 and 3 show that the supply tank assembly 18 includes a supply tank 92 with an integral supply tank top portion 94, and a cap assembly 96 threaded to a neck of the supply tank 92. The cap assembly 96 is removable so that the supply tank 92 may be filled with cleaning fluid. A plunger valve 104 (shown partly in FIG. 3) may be disposed in the center column of the cap assembly 96.

As shown in FIG. 2, the supply tank seat 80 has a receiver opening 106 and a seal 108 disposed around the receiver opening 106. The seal 108 is shown at the receiver opening 106 for purposes of illustration, but may instead be carried on (e.g., connected directly or indirectly to) the cap assembly 96 to seal the cap assembly 96 at the receiver opening 106. A screen 107 is disposed over the receiver opening 106. The cap assembly 96 is sized to be received within the receiver opening 106 and a receiving component 110 functionally mates with the cap assembly 96 at the receiver opening 106 to actuate the valve 104, opening the valve 104 and allowing flow from the supply tank 92 through the cap assembly 96 and then through the fluid line 46 shown in FIG. 3 that extends to the fluid pump 44. The supply tank assembly 18 thus fluidly couples with the fluid pump 44 at the supply tank seat 80.

The supply tank assembly 18 is latched to the base 12 via a spring-biased latch 234 that is housed under the supply tank seat 80 as indicated with hidden lines in FIG. 2. The latch 234 is biased toward the receiver opening 106 by a spring 236 also housed under the supply tank seat 80 and indicated with hidden lines. The latch 234 may engage the neck 98 of the supply tank 92 when the supply tank assembly 18 is seated at the supply tank seat 80. To remove the supply tank assembly 18, a user pulls straight upward on the supply tank assembly 18. The neck 98 will push laterally outward on the latch 234 sufficiently to overcome the spring 236 and cause the latch 234 to retract from the neck 98. To refill the supply tank 92, the supply tank 92 is inverted so that the cap assembly 96 is facing upward with the top portion 94 facing downward, the cap assembly 96 is removed, and cleaning fluid is poured into the supply tank 92 through the neck 98.

The supply tank 92 has an inner wall 114 indicated in FIGS. 1 and 2 that forms a vertical channel 114A extending from a bottom wall 92B of the supply tank 92 to a top of the supply tank assembly 18, e.g., to a top 94A of the top portion 94, and opening upward at the top 94A of the top portion 94. The bottom wall 92B is configured to be received by the supply tank seat 80, with the inner wall 114 fitting within the first side wall 64 of the housing 14 and with the first leg portion 16C of the handle 16 and extending along the first leg portion 16C to the grip portion 16B, as best shown in FIG. 3. Specifically, the protruding vertical column 64A fits within and is nested into a vertical channel 114A of the supply tank 92, and the first leg portion 16C also fits within and is nested into the vertical channel 114A above the vertical column 64A.

Figure 6:
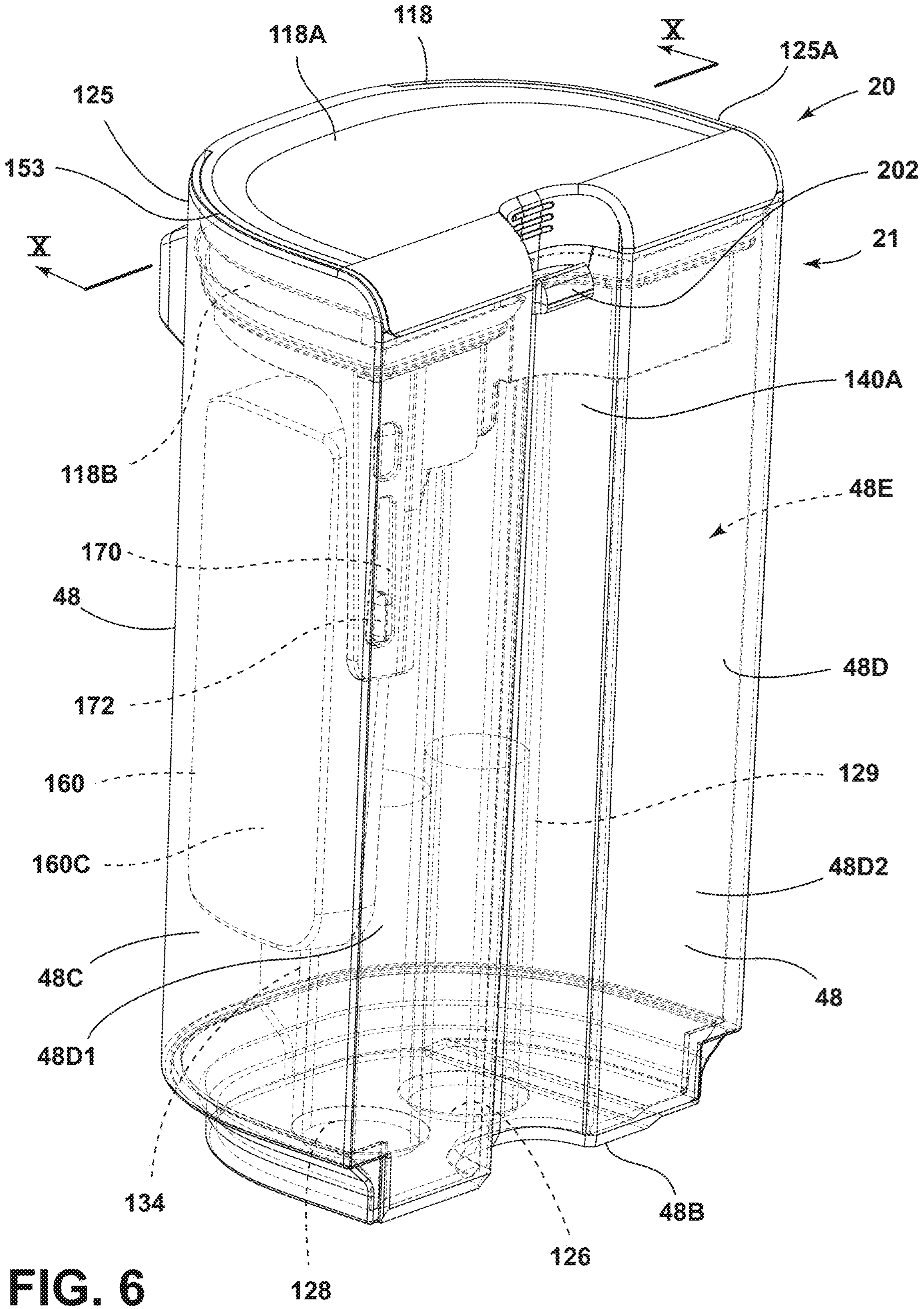
FIG. 6 is a top perspective view of the recovery tank assembly showing a relatively planar interior side wall.

FIG. 6 shows the recovery tank assembly 20 that includes a recovery tank 48 and a recovery tank lid assembly 118 removably couplable to the recovery tank 48 for emptying the recovery tank 48. Specifically, the recovery tank lid assembly 118 is mounted to a top 125 of the recovery tank 48 at a top opening 125A opposite from a bottom wall 48B of the recovery tank 48. The recovery tank assembly 20 is part of an air/liquid separation system 21 of the extraction cleaner 10. The recovery tank 48 includes a plurality of side walls, including a curvilinear exterior side wall 48C and a relatively planar interior side wall 48D. The curvilinear exterior side wall 48C extends upward from the bottom wall 48B to the top opening 125A. The relatively planar interior side wall 48D also extends upward from the bottom wall 48B to the top opening 125A. The relatively planar interior side wall 48D is connected to the curvilinear exterior side wall 48C such that the relatively planar interior side wall 48D and the curvilinear exterior side wall 48C together define the entire top opening 125A. The relatively planar interior side wall 48D and the curvilinear exterior side wall 48C together with the bottom wall 48B entirely define a tank chamber 48E that extends from the bottom wall 48B to the top opening 125A. The exterior wall 48C of the recovery tank 48 is supported against the lower rim 86, and has an arcuate shape that mates to the arcuate shape of the lower rim 86 inward thereof. The bottom wall 48B of the recovery tank 48 rests against the recovery tank seat 82 as shown in FIG. 3.

As shown in FIG. 6, the relatively planar interior side wall 48D of the recovery tank 48 forms a vertical channel 140A between a front planar portion 48D1 and a rear planar portion 48D2 of the relatively planar interior side wall 48D and extends from the bottom wall 48B of the recovery tank assembly 20 (e.g., the bottom wall 48B of the recovery tank 48) to a top of the recovery tank assembly 20, e.g., to a top lid portion 118A of the lid assembly 118. The vertical channel 140A opens upward at the top lid portion 118A of the lid assembly 118. Stated differently, the vertical channel 140A extends along both the recovery tank 48 and the recovery tank lid assembly 118 as a continuous recess in the recovery tank 48 and in the recovery tank lid assembly 118.

The recovery tank assembly 20 is configured to be received by the recovery tank seat 82 with the relatively planar interior side wall 48D fits within the second side wall 66 of the housing 14 and with the second leg portion 16D of the handle 16 and extending along the second leg portion 16D to the grip portion 16B, as best shown in FIG. 3. Specifically, the protruding vertical column 66A fits within and is nested in the vertical channel 140A of the recovery tank 48 and the second leg portion 16D also fits within and is nested in the vertical channel 140A of the recovery tank 48 above the vertical column 66A in FIG. 3. The vertical column 66A extends to the grip portion 16B when the recovery tank 48 is seated at the recovery tank seat 82.

With reference to FIS. 1, 3, 6, and 7, the recovery tank 48 is releasably latched to the base 12 in a manner that ensures stability when the extraction cleaner 10 is in use, and promotes ease of removal for emptying of the recovery tank 48. Specifically, a latching mechanism 200 shown in FIG. 3 is operable to latch the recovery tank assembly 20 to the base 12 when the relatively planar interior side wall 48D of the recovery tank 48 is fit within the second side wall 66 of the housing 14 (see FIG. 1). Specifically, the recovery tank assembly 20 is latched to the handle 16 of the base 12 by the latching mechanism 200, and more specifically to the second leg portion 16D of the handle 16. The relatively planar interior side wall 48D of the recovery tank 48 includes a projection 202 shown in FIG. 6 that is engaged by the latching mechanism 200 to latch the recovery tank assembly 20 to the base 12 when the relatively planar interior side wall 48D of the recovery tank 48 is fit within the second side wall 66 to the housing 14.

To unlatch the recovery tank assembly 20 from the base 12, the user pulls a protrusion 230 at the exterior wall 48C of the recovery tank 48 shown in FIG. 3. Pulling the protrusion 230 laterally outward away from the handle 16 unlatches the latching mechanism 200 by disengaging the latching mechanism 200 from the projection 202. Once the latching mechanism 200 is unlatched, the user can then lift upward on the recovery tank assembly 20 to remove it from the recovery tank seat 82.

Referring again to FIG. 2, the recovery tank seat 82 has a first receiver opening 122 and a second receiver opening 124. The bottom wall 48B of the recovery tank 48 has an inlet opening 126 that mates with the first receiver opening 122 and an outlet opening 128 that mates with the second receiver opening 124 when the recovery tank assembly 20 is received by the recovery tank seat 82. The inlet opening 126 and the outlet opening 128 are shown in FIGS. 4-7.

Figure 4:
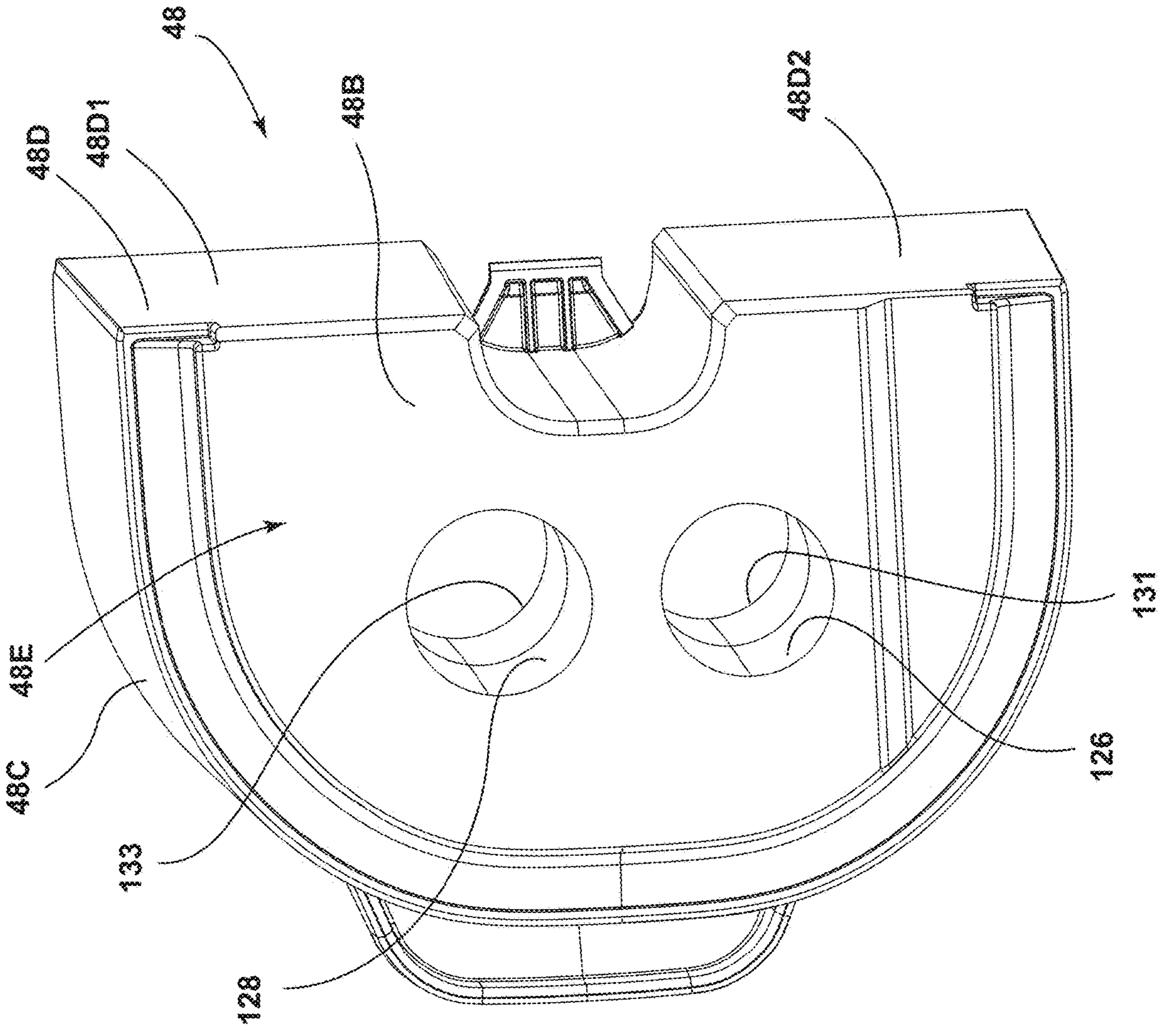
FIG. 4 is a bottom perspective view of a recovery tank included in the recovery tank assembly of the present disclosure.
Figure 5:
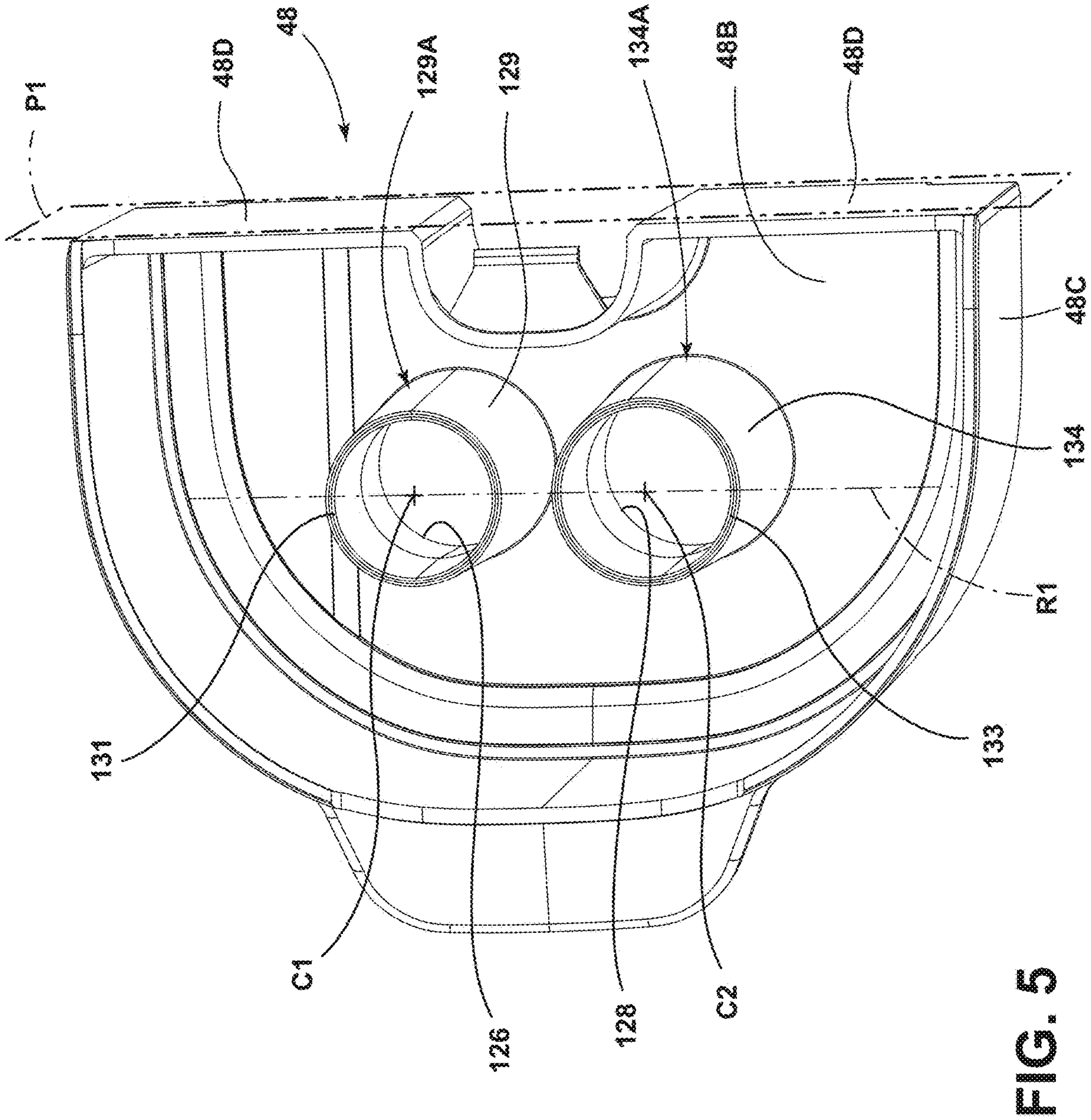
FIG. 5 is a top perspective view of the recovery tank of FIG. 4.
Figure 10:
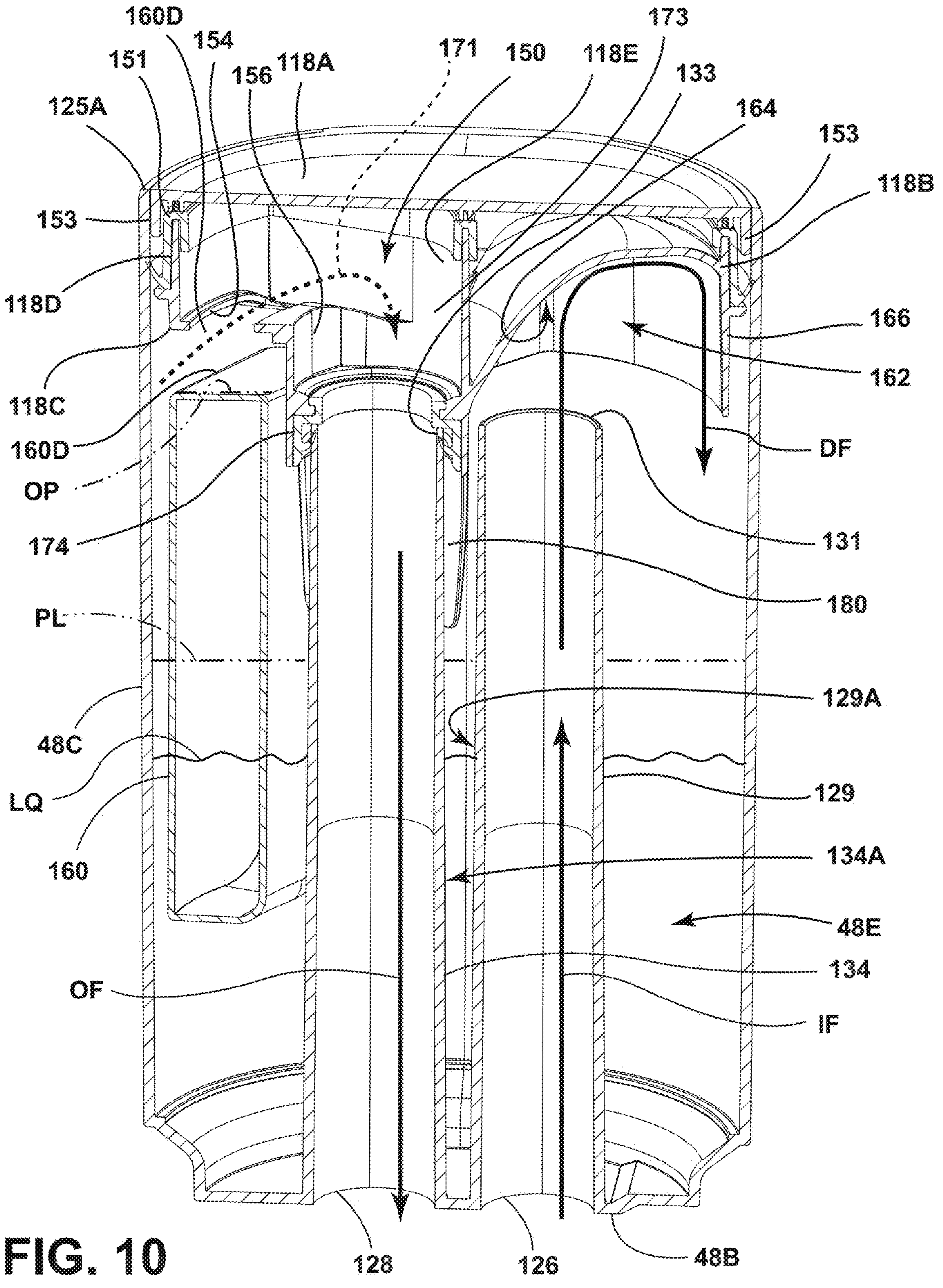
FIG. 10 is a cross-sectional view of the recovery tank assembly taken at lines X-X in FIG. 6.

As best shown in FIGS. 4 and 5, the recovery tank assembly 20 includes an inlet stack 129 extending upward from the inlet opening 126 to an outlet 131, and an outlet stack 134 extending upward from the outlet opening 128 to an inlet 133. Stated differently, the inlet of the inlet stack 129 is at the inlet opening 126 in the bottom wall 48B while the outlet 131 of the inlet stack 129 is above the inlet opening 126 and open within the tank chamber 48E as best shown in FIG. 10. Flow within the inlet stack 129 is upward. In contrast, the outlet of the outlet stack 134 is at the outlet opening 128 in the bottom wall 48B while the inlet 133 of the outlet stack 134 is above the outlet opening 128 and within the tank chamber 48E but coupled to the lid assembly 118 as further discussed herein. Flow within the outlet stack 134 is downward.

With reference to FIGS. 5 and 10, an exterior 129A of the inlet stack 129 is spaced apart from and not connected to an exterior 134A of the outlet stack 134 such that the inlet stack 129 is free-standing within the tank chamber 48E. In fact, the inlet stack 129 extends upward from the inlet opening 126 at the bottom wall 48B to the outlet 131 without interfacing with or connecting to any other components along its exterior 129A.

The recovery tank assembly 20 fluidly couples with the working air stream via the first receiver opening 122, which provides a mixture of dirty liquid and air from the suction hose 22 (e.g., extracted liquid and debris entrained therein) that travels upward in the inlet stack 129 within the recovery tank 48 to the outlet 131, as indicated by in flow arrow IF in FIG. 10. After the air/liquid separation process discussed herein, air separated from the working air stream is expelled from the recovery tank 48 through the outlet stack 134 to the outlet opening 128 as indicated by outflow arrow OF.

Figure 7:
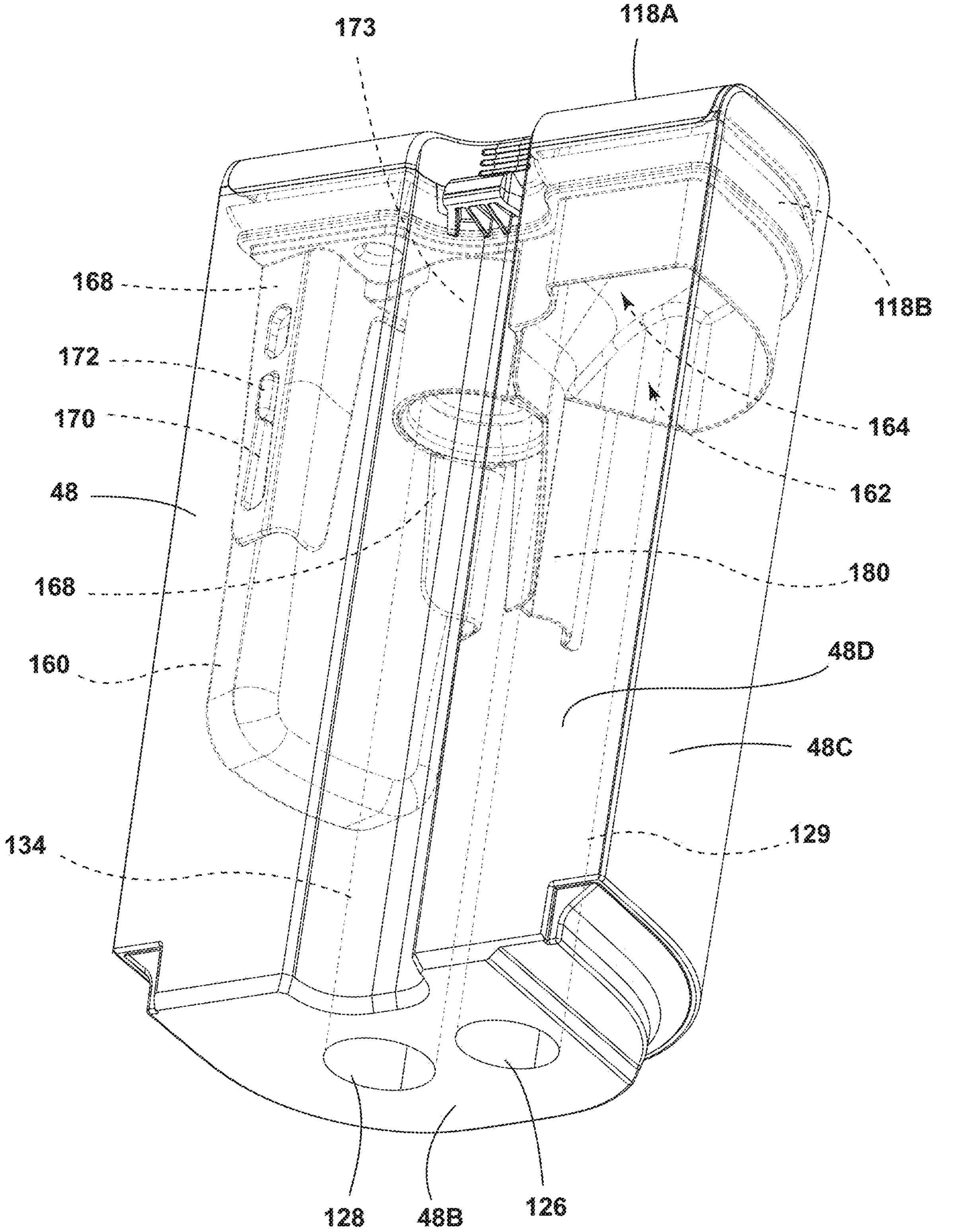
FIG. 7 is a bottom perspective view of the recovery tank assembly showing a bottom wall.
Figure 8:
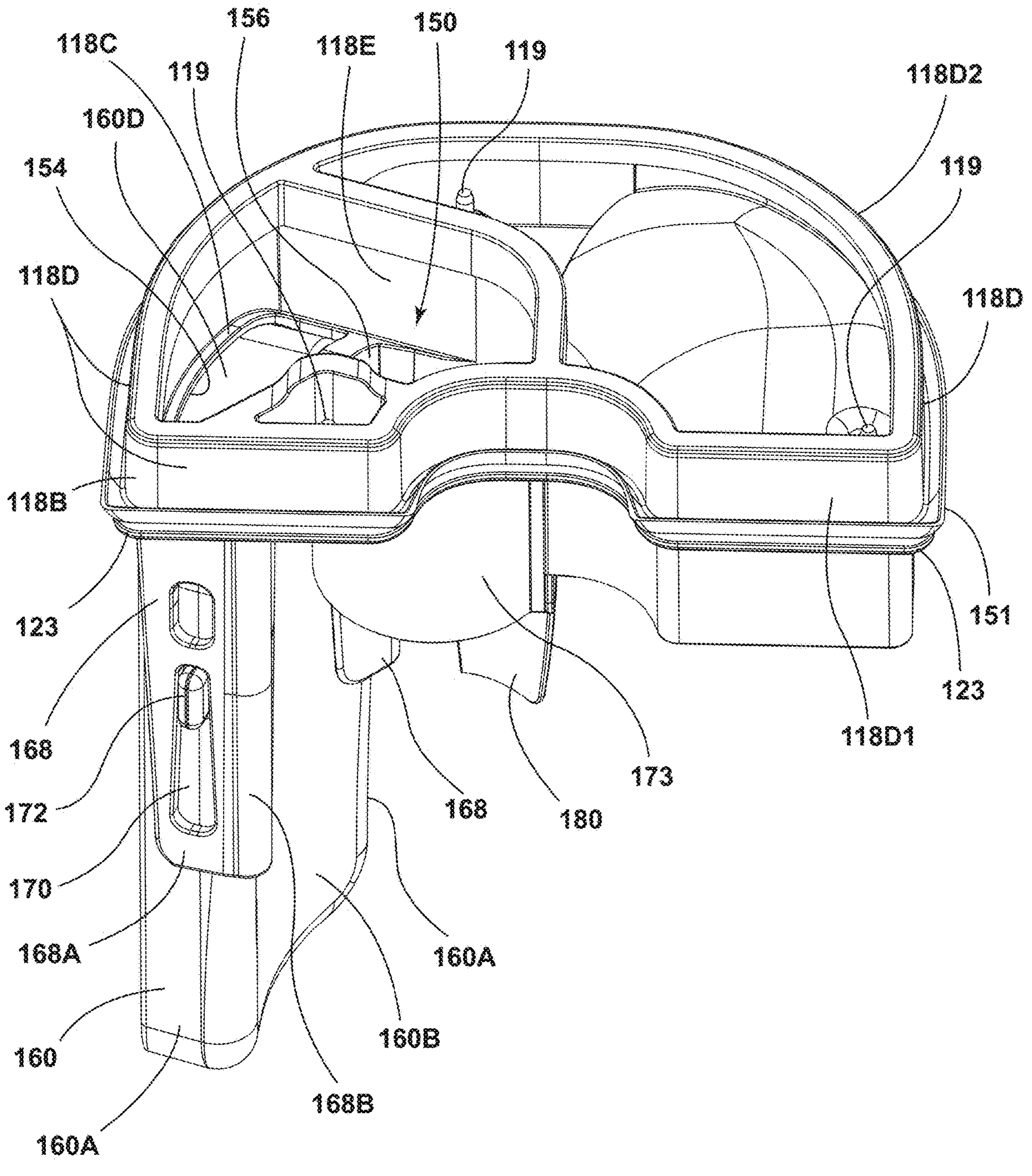
FIG. 8 is a rear perspective view of a lid assembly and a float included in the recovery tank assembly with a top lid portion of the lid assembly removed.
Figure 12:
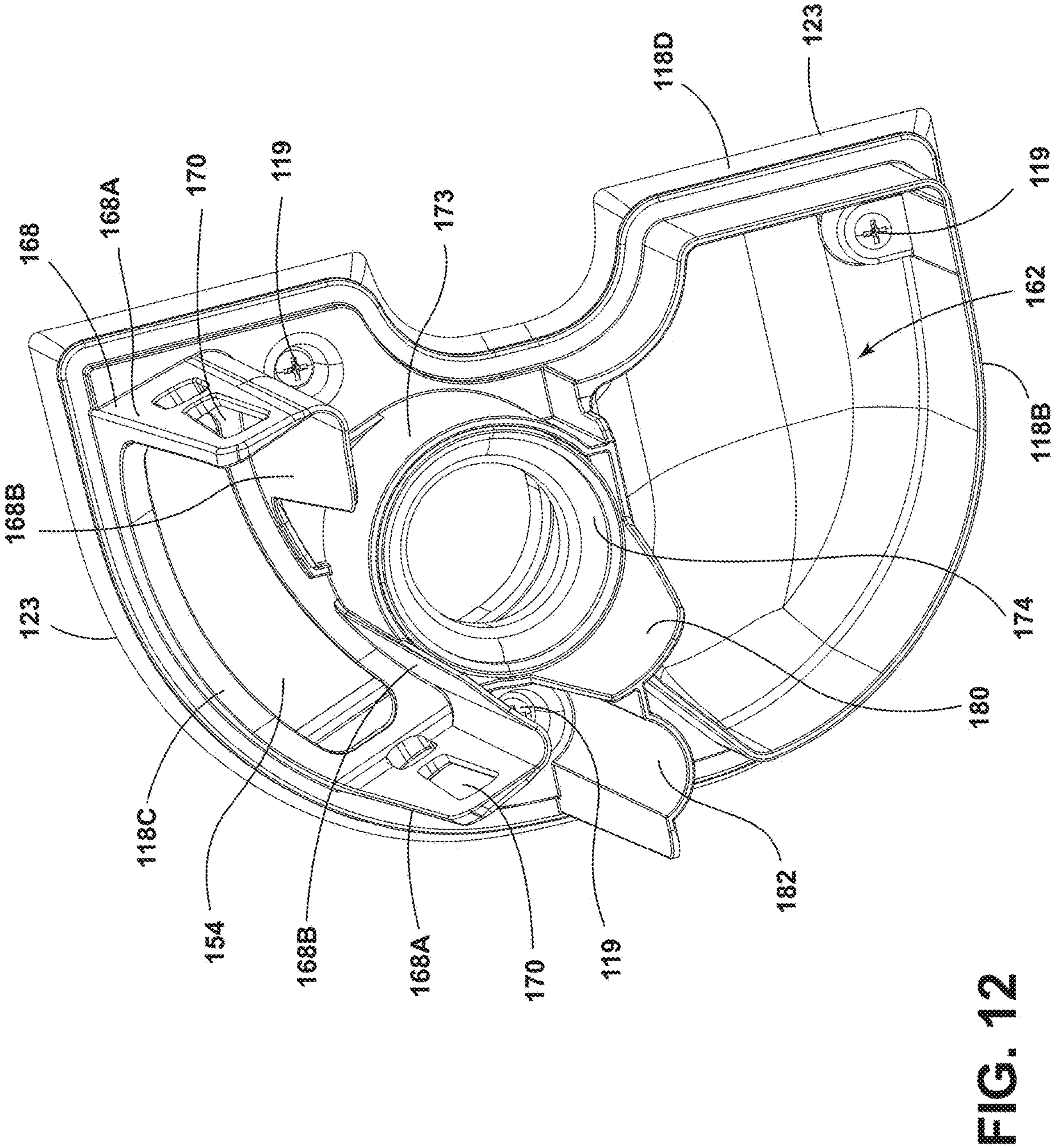
FIG. 12 is a bottom perspective view of the bottom lid portion.

FIGS. 6 and 7 show the lid assembly 118 including a top lid portion 118A and a bottom lid portion 118B secured to one another. The bottom lid portion 118B is shown in FIGS. 8 and 12 having three fasteners 119 extending upward through the bottom lid portion 118B at fastener openings. The fasteners 119 are received in internally-threaded bosses 121 that extend downward from the top lid portion 118A as shown in FIG. 9.

Referring now to FIGS. 10 and 12, the lid assembly 118 has a bottom wall 118C that extends parallel to the bottom wall 48B of the recovery tank 48. Specifically, the bottom wall 118C is in the bottom lid portion 118B. The bottom lid portion 118B also includes an upwardly-extending perimeter wall 118D, best shown in FIG. 8, bordered by an outer perimeter 123 of the lid assembly 118. The upwardly-extending perimeter wall 118D includes a relatively straight portion 118D1 and a curvilinear portion 118D2. The bottom lid assembly 118B has an upwardly-extending inner wall 118E that connects the relatively straight portion 118D1 of the perimeter wall 118D (which is at the relatively planar interior side wall 48D of the recovery tank 48) to the curvilinear portion 118D2 of the perimeter wall 118D (which is at the curvilinear exterior side wall 48C of the recovery tank 48). The bottom lid portion 118B, the top lid portion 118A, and the upwardly-extending inner wall 118E bound a lid chamber 150. A seal 151 overlays the top of the perimeter wall 118D and the inner wall 118E.

Figure 9:
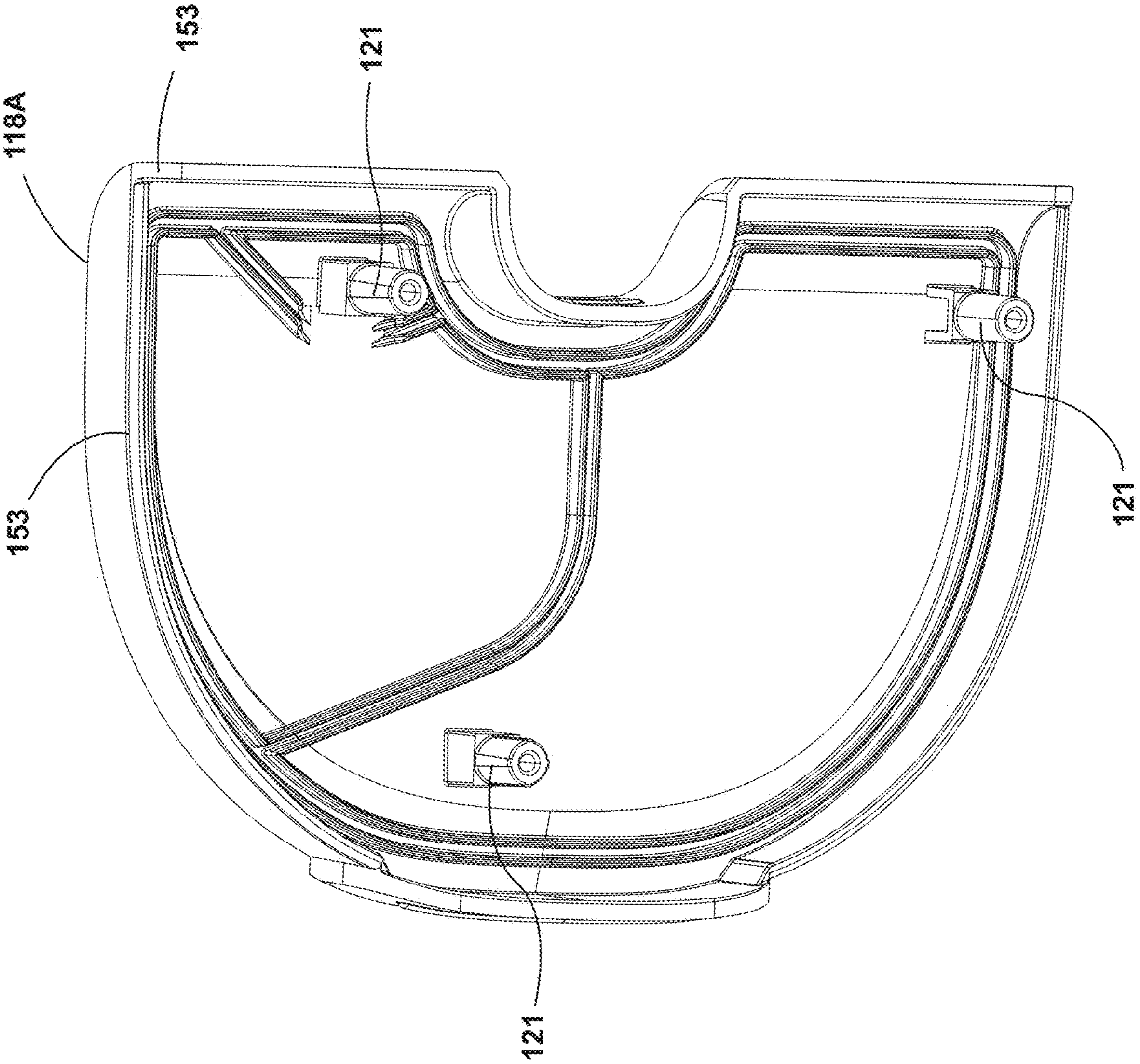
FIG. 9 is a bottom perspective view of the top lid portion.

As shown in FIGS. 6, 9, and 10, an outer perimeter 153 of the top lid portion 118A fits to the top 125 of the recovery tank 48 at the top opening 125A as best shown in FIG. 10. The outer perimeter 153 of the top lid portion 118A and the outer perimeter 123 of the bottom lid portion 118B follow and seal to the curvilinear exterior side wall 48C and to the relatively planar interior side wall 48D at the top 125 of the recovery tank 48 via the seal 151 to enclose the top opening 125A, e.g., to sealingly close the top opening 125A.

Figure 11:
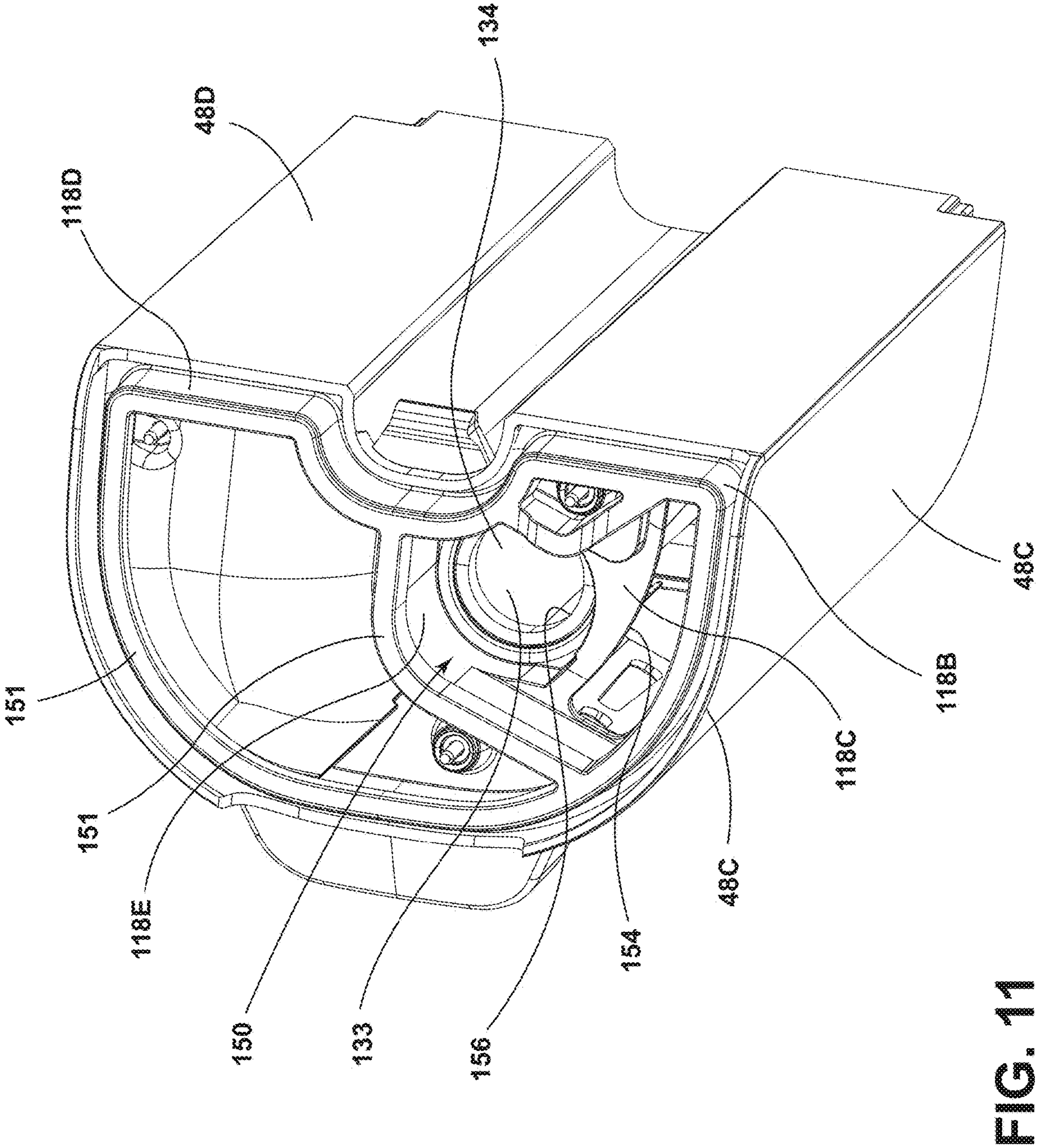
FIG. 11 is a top perspective view of the recovery tank assembly with the top lid portion and the float removed.

With reference to FIGS. 8, 10, and 11, the lid chamber 150 has a first lid chamber opening 154 in the bottom wall 118C of the lid assembly 118, and, more specifically, the bottom wall 118C of the bottom lid portion 118B. The lid chamber 150 also has a second lid chamber opening 156 in the bottom wall 118C that is in fluid communication with the inlet 133 of the outlet stack 134 when the lid assembly 118 is disposed on the recovery tank 48. The first lid chamber opening 154 and the second lid chamber opening 156 are the only openings of the lid chamber 150.

The first lid chamber opening 154 is in selective fluid communication with the tank chamber 48E dependent upon a position of a float 160 as described herein. The first lid chamber opening 154 serves as a tank chamber air outlet. The second lid chamber opening 156 is in continuous fluid communication with the inlet 133 of the outlet stack 134. Stated differently, the lid chamber 150 is only selectively (e.g., sometimes, but not always) in fluid communication with the tank chamber 48E, based on the position of the float 160, and the lid chamber 150 is always in fluid communication with the outlet stack 134.

As best illustrated in FIG. 10, a bottom (also referred to as the bottom lid portion 118B) of the lid assembly 118 defines an open bottom cavity 162 within the tank chamber 48E and above the outlet 131 of the inlet stack 129. More specifically, the bottom lid portion 118B of the lid assembly 118 has a lower surface 164 at the open bottom cavity 162. The lower surface 164 can have a non-planar cross-sectional shape, such as the illustrated concave shape, that inclines upward and outward from above the outlet 131 of the inlet stack 129 to an outermost side wall 166 of the lid assembly 118 to direct fluid and dirt entrained in the working air stream away from the outlet 131 of the inlet stack 129 and toward the tank chamber 48E. The outermost side wall 166 is a downwardly-extending wall bordering at least a portion of the relatively planar interior side wall 48D and at least a portion of the curvilinear exterior side wall 48C of the recovery tank 48. The outermost side wall 166 and the lower surface 164 together define the open bottom cavity 162. The lower surface 164 of the lid assembly 118 thus inclines upward and outward from above the outlet 131 of the inlet stack 129 toward the curvilinear exterior side wall 48C.

With reference again to FIG. 10, the liquid and air mixture with entrained dirt and debris that enters the inlet stack 129 is indicated by inflow arrow IF and will encounter the lower surface 164 and be directed outward and upward away from the outlet 131 in the open bottom cavity 162 as indicated by arrow DF in FIG. 10. Eventually, the liquid will fall downward out of the open bottom cavity 162 to the bottom of the recovery tank chamber 48E by gravity, separating from the air. Depending on the liquid level (e.g., if the float 160 is not closing the first lid chamber opening 154), the air can then exit from the recovery tank chamber 48E through the first lid chamber opening 154, the lid chamber 150, and the outlet stack 134, as discussed herein, to the second receiver opening 124 and through the conduits 37 to the motor and impeller assembly to be exhausted from the extraction cleaner 10. By fully utilizing the lower side of the lid assembly 118 in this manner, the liquid in the incoming working air stream may be sufficiently slowed so that air may separate therefrom without excessive splash. The spacing of the lower surface 164 above the outlet 131 of the inlet stack 129 is configured to influence the speed and direction of incoming flow within the recovery tank 48 so that the lower surface 164 guides the liquid out and away to then fall downward via gravity in a more efficient, controllable, and predictable manner.

Figure 13:
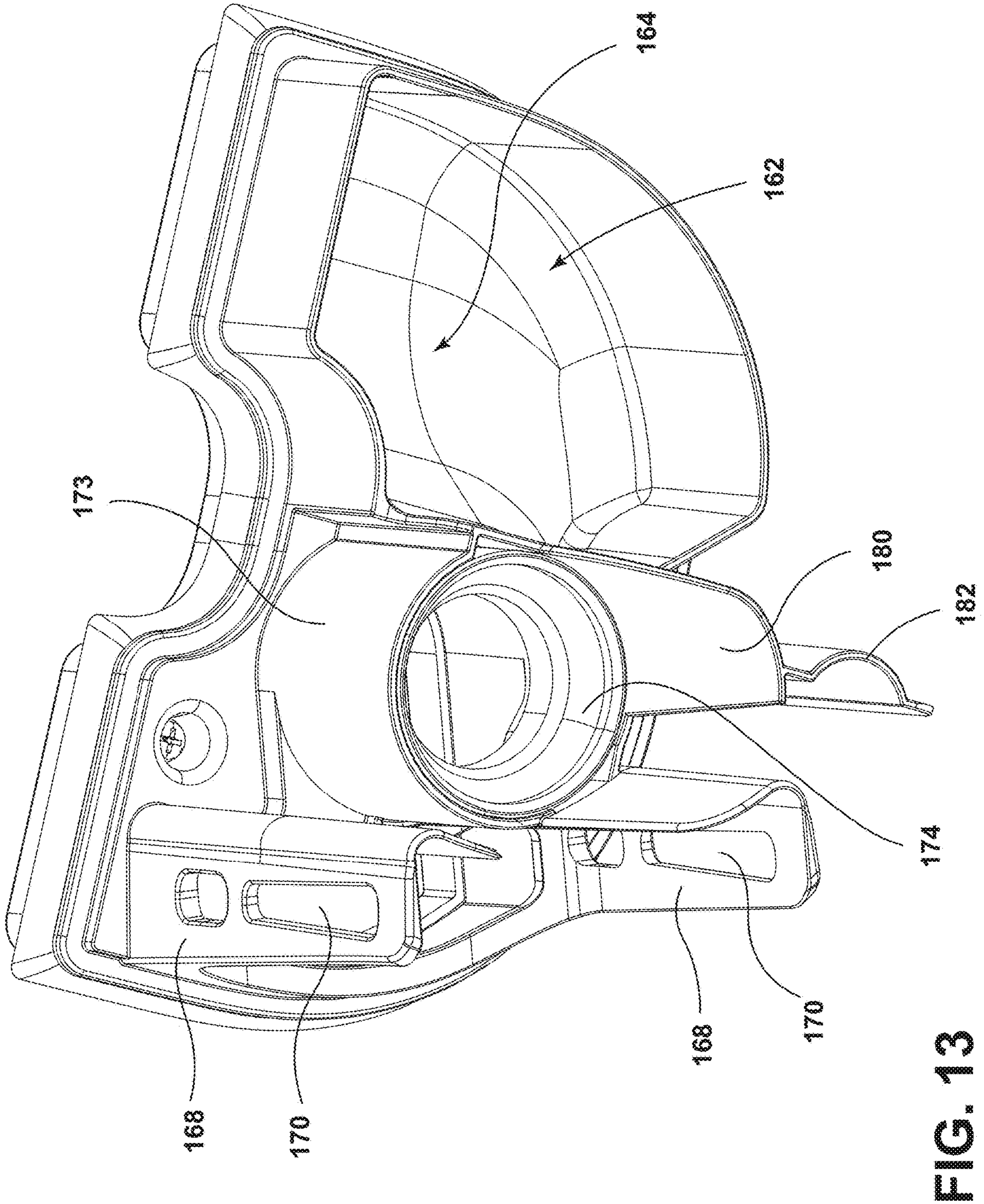
FIG. 13 is another bottom perspective view of the bottom lid portion.
Figure 14:
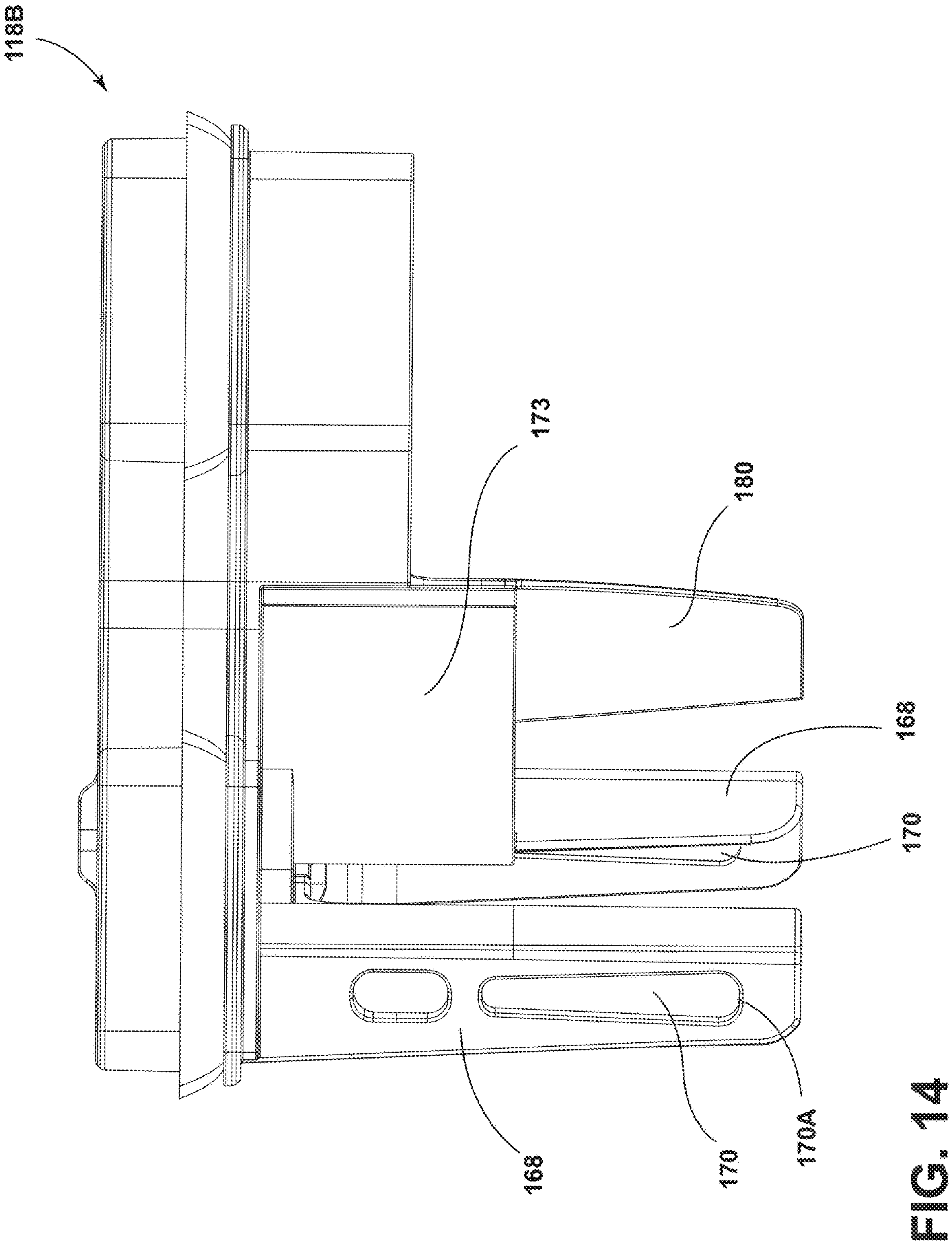
FIG. 14 is a side view of the bottom lid portion.

The float 160 is disposed within the tank chamber 48E and is operatively attached to and vertically translatable relative to the lid assembly 118 to close the first lid chamber opening 154 when liquid in the tank chamber 48E reaches a predetermined level PL indicated in phantom in FIG. 10. The float 160 is shown in the open position in FIGS. 6 and 10 with liquid at level LQ. When the liquid in the tank chamber 48E rises to the predetermined level PL, the top 160D of the float 160 fits to and seals against the bottom wall 118C of the lid assembly 118 at the lid chamber opening 154 to close the lid chamber opening 154, as shown in FIGS. 7 and 8. As shown in FIGS. 8, 12, and 13, the bottom lid portion 118B of the lid assembly 118 includes a pair of downwardly-extending guide rails 168 spaced apart from and not connected to one another. Stated differently, the guide rails 168 are not directly connected to one another. The guide rails 168 each have a side portion 168A and a back portion 168B, as best shown in FIG. 12, so that each guide rail 168 wraps partially around the float 160 from sides 160A of the float 160 to an inner side 160B of the float 160, as shown in FIG. 8.

The guide rails 168 include slots 170 extending therethrough. Stated differently, each guide rail 168 includes at least one slot 170 extending through the side portion 168A. The float 160 includes side extensions 172. Each side wall 160A of the float 160 includes a side extension 172 that extends through the respective slot 170 in the adjacent guide rail 168. One side extension 172 is shown in the near side wall 160A in FIG. 8. A like side extension also extends outward from the far side wall 160A in FIG. 8.

The float 160 is translatable along the guide rails 168 at the slots 170. The first lid chamber opening 154 is disposed above the float 160 and between the guide rails 168. The float 160 moves up and down within the tank chamber 48E between a lowest position in which the side extensions are at the bottom 170A of the guide slots 170 (see FIGS. 6 and 10) to a highest position in which a top 160D of the float 160 closes the first lid chamber opening 154 (see FIGS. 7 and 8). The float 160 is configured to close the first lid chamber opening 154 when liquid within the tank chamber 48E reaches the predetermined level PL. In other words, the float 160 is lifted upward toward the first lid chamber opening 154 by the liquid collected in the tank chamber 48E until the top 160D of the float 160 closes the first lid chamber opening 154 when the liquid reaches the predetermined level PL, preventing air flow through the first lid chamber opening 154, thereby indicating a full recovery tank 48 and thus prompting the user to empty the recovery tank 48.

In contrast, when liquid in the tank chamber 48E is below the predetermined level PL, such as at liquid level LQ in FIG. 10, the top 160D of the float 160 is below and spaced apart from the first lid chamber opening 154. The separated air gathered above the liquid in the tank chamber 48E can thus exit the tank chamber 48E through the first lid chamber opening 154 and enter the lid chamber 150 (as indicated by arrow 171 in FIG. 10), then passing into the outlet stack 134 through the second lid chamber opening 156 and the inlet 133 as indicated by outflow arrow OF.

As shown in FIGS. 6, 7, and 10, the float 160 is disposed adjacent to the curvilinear exterior side wall 48C. Additionally, the inlet stack 129 and outlet stack 134 are disposed transversely side-by-side in the tank chamber 48E with the outlet stack 134 between the float 160 and the inlet stack 129. The description of the inlet stack 129 and the outlet stack 134 being transversely side-by-side refers to the center axis C1 of the inlet stack 129 and the center axis C2 of the outlet stack 134 being disposed along a line forming a row R1 that is parallel to a plane P1 that falls along the exterior surface of the planar portions 48D1, 48D2 of the relatively planar interior side wall 48D as shown in FIG. 5. Arranging the inlet stack 129 and outlet stack 134 in this relative position best enables them to fit within the available space in the recovery tank chamber 48E with each having a relatively large circumference and flow area at a cross-section perpendicular to the longitudinal center axes C1, C2. Additionally, corresponding placement of the first and second receiver openings 122, 124 in the base 12 may enable efficient packaging and placement of the conduits 37 and other components within the internal cavity 30. The transversely side-by-side arrangement of the stacks 129, 134 in the recovery tank chamber 48E with the outlet stack 134 between the float 160 and the inlet stack 129 may afford more room between the side walls 48C, 48D and the inlet and outlet stacks 129, 134 than other arrangements which may improve the ability of a user to wipe the insides of the recovery tank 48 after use.

The float 160 is compactly shaped and positioned in order to enable the aforementioned positioning of the inlet stack 129 and the outlet stack 134 in light of the curvilinear shape of the curvilinear exterior side wall 48C and still afford sufficient room to allow the surface area of the lower surface 164 on the opposite side of the tank chamber 48E to be sufficiently large and to have a gradual incline to promote separation of liquid from the incoming working air stream. Specifically, the float 160 has a curvilinear exterior side 160C disposed adjacent to and following a contour of the curvilinear exterior side wall 48C of the recovery tank 48, as best shown in FIG. 6. The curvilinear exterior side wall 48C is convex at an outer side and concave at an inner side. The exterior side 160C of the float 160 is convex and the inner side 160B of the float 160 is concave. The first lid chamber opening 154 also has an arcuate shape (best shown in FIGS. 11 and 12) that follows a contour of the curvilinear exterior side wall 48C. A top wall 160D of the float 160 has a shape configured to close the first lid chamber opening 154. For example, the top wall 160D may have a convex outer edge matching the profile of the exterior side 160C and a concave inner edge matching the profile of the inner side 160B.

The lid assembly 118 is removable from the recovery tank 48 with the inlet stack 129 and the outlet stack 134 remaining in the recovery tank 48. Emptying of the recovery tank 48 may thus be simplified as the user will not need to address potential dripping of the stacks 129, 134 that could occur if they removed from the recovery tank 48 with the lid assembly 118. The lid assembly 118 may be easier to rinse and clean after use of the extraction cleaner 10 if the stacks 129, 134 remain in the recovery tank 48. The recovery tank 48 with the retained stacks 129, 134 is also relatively easy to rinse and clean after use. FIG. 8 shows the lid assembly 118 with the float 160 attached and the lid assembly 118 and the float 160 removed from the recovery tank 48 as a unit (except that the top lid portion 118A is removed for purposes of viewing the structure of the bottom lid portion 118B). The float 160 may be easier to rinse and clean after use of the extraction cleaner 10 when it remains part of a unit with the lid assembly 118 than if it was retained by the recovery tank 48. Additionally, with the float 160 removed, the recovery tank 48 and retained stacks 129, 134 may be easier to clean. FIG. 5 shows the inlet stack 129 and the outlet stack 134 remaining in the recovery tank 48 with the lid assembly 118 removed.

The recovery tank assembly 20 includes additional features that assist with connection of the lid assembly 118 to the recovery tank 48 after emptying the recovery tank 48 while ensuring the integrity of the air/liquid separation system 21. For example, the lid assembly 118 includes an outlet stack connector 173 that extends downward into the tank chamber 48E at the second lid chamber opening 156 as shown in FIGS. 7-8, 10, and 12-14 and is configured to sealingly engage the inlet 133 of the outlet stack 134 as shown in FIG. 10. A seal 174 may be carried on a lower extent of the outlet stack connector 173 as shown in FIG. 10 and may be configured to engage the top edge of the outlet stack 134 at the inlet 133. As is evident in FIG. 10, the outlet stack connector 173 extends downward to a lower-most portion of the open bottom cavity 162. In fact, the outlet stack connector 173 defines the lower-most portion of the open bottom cavity 162 and also the lower-most portion of the lid chamber 150. Because the lower surface 164 of the bottom of the lid assembly 118 begins its upward incline at a bottom of the outlet stack connector 173, providing the outlet stack connector 173 in a relatively low position enables better direction and control of the fluid and entrained debris exiting the inlet stack 129.

The lid assembly 118 also includes a downwardly-extending guide flange 180 configured to at least partially surround the outlet stack 134. FIGS. 8, 12, and 13 best show the guide flange 180. FIGS. 7 and 10 show the guide flange 180 partially surrounding the outlet stack 134. The guide flange 180 helps direct the top of the outlet stack 134 into position against the seal 174 when placing the lid assembly 118 on the recovery tank 18.

A splash guard 182 extends from the guide flange 180 toward the outer perimeter of the lid assembly 118 as shown in FIGS. 12 and 13. Like the guide flange 180, the splash guard 182 extends lower in the tank chamber 48E than the inlet 133 of the outlet stack 134 and lower than the outlet 131 of the inlet stack 129. Together, the guide flange 180 and the splash guard 182 shield the area between the outlet stack connector 173 and the curvilinear outer perimeter 123 of the lid assembly 118 from the open bottom cavity 162 and splashing and associated spray that may occur therein, helping to minimize unintended entry of liquid into the lid chamber 150. Additionally, the guide flange 180 and the splash guard 182 prevent the incoming liquid from flowing directly to the first lid chamber opening 154 rather than dropping downward into and being captured in the recovery tank 48. By blocking incoming flow, the guide flange 180 and the splash guard 182 work to further support the goal of the lower surface 164 to slow the flow sufficiently so that liquid and debris drops out of the air into the recovery tank 48 before the air exits.

Accordingly, the recovery tank assembly 20 and the lid assembly 118 enable the air/liquid separation system 21 to utilize the shape and volume of the recovery tank 48 and the confines of the curvilinear exterior side wall 48C and relatively planar interior side wall 48D to enable efficient separation of air and fluid from the working air stream.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The following Clauses provide example configurations of an air/liquid separation system disclosed herein.

Clause 1. An air/liquid separation system for an extraction cleaner includes a suction source for generating a working air stream and a fluid source for supplying a cleaning fluid to a surface to be cleaned. The air/liquid separation system includes a recovery tank assembly with a recovery tank, an inlet stack for receiving the working air stream with extracted liquid and debris entrained therein, an outlet stack for expelling air separated from the working air stream, and a lid assembly. The recovery tank defines a tank chamber with a top opening. The recovery tank has a bottom wall, a curvilinear exterior side wall that extends upward from the bottom wall to the top opening, and a relatively planar interior side wall that extends upward from the bottom wall to the top opening and is connected to the curvilinear exterior side wall. The relatively planar interior side wall and the curvilinear exterior side wall together surround the tank chamber and define the top opening. The bottom wall has an inlet opening and an outlet opening, and the inlet opening receives the working air stream. The inlet stack extends upward from the inlet opening and the outlet stack extends upward from the outlet opening. The lid assembly defines a lid chamber that has a first lid chamber opening in selective fluid communication with the tank chamber and that serves as a tank chamber air outlet and a second lid chamber opening at an inlet of the outlet stack. An outer perimeter of the lid assembly follows and seals to the curvilinear exterior side wall and to the relatively planar interior side wall at the top of the recovery tank to enclose the top opening of the recovery tank. A float is disposed within the tank chamber and is operatively attached to and vertically translatable relative to the lid assembly to close the first lid chamber opening when liquid in the tank chamber reaches a predetermined level. The float is disposed adjacent to the curvilinear exterior side wall and the inlet stack and outlet stack are disposed transversely side-by-side in the tank chamber with the outlet stack between the float and the inlet stack.

Clause 2. The lid assembly includes a downwardly-extending wall that borders at least a portion of the relatively planar interior side wall and at least a portion of the curvilinear exterior side wall and defines an open bottom cavity within the tank chamber and above an outlet of the inlet stack. A lower surface of the lid assembly at the open bottom cavity inclines upward and outward from above the outlet of the inlet stack to the downwardly-extending wall at the curvilinear exterior side wall to deflect fluid and dirt entrained in the working air stream away from the outlet of the inlet stack.

Clause 3. The float has a curvilinear exterior side adjacent to and follows a contour of the curvilinear exterior side wall of the recovery tank.

Clause 4. The first lid chamber opening has an arcuate shape that follows a contour of the curvilinear exterior side wall.

Clause 5. The lid assembly includes a pair of downwardly-extending guide rails spaced apart from and not connected to one another. The first lid chamber opening is disposed between the guide rails. The guide rails include slots that extend therethrough. The float includes side extensions that extend through the slots, with the float translatable along the guide rails at the slots.

Clause 6. The lid assembly includes an outlet stack connector that extends downward into the tank chamber at the second lid chamber opening. The outlet stack connector is configured to sealingly engage the inlet of the outlet stack.

Clause 7. A lower surface of the lid assembly inclines upward and outward from above the outlet of the inlet stack toward the curvilinear exterior side wall to deflect fluid and dirt entrained in the working air stream away from the outlet of the inlet stack. The outlet stack connector extends downward to a lower-most portion of the lower surface.

Clause 8. The lid assembly includes a downwardly-extending guide flange configured to at least partially surround the outlet stack.

Clause 9. The lid assembly includes a bottom lid portion and a top lid portion secured to one another. The bottom lid portion includes an upwardly-extending perimeter wall bordered by the outer perimeter of the lid assembly and an upwardly-extending inner wall. The upwardly-extending wall connects the upwardly-extending perimeter wall at the relatively planar interior side wall of the recovery tank to the upwardly-extending perimeter wall at the curvilinear exterior side wall of the recovery tank. The bottom lid portion, the top lid portion, and the upwardly-extending inner wall bound the lid chamber.

Clause 10. An exterior of the inlet stack is spaced apart from and not connected to an exterior of the outlet stack such that the inlet stack is free-standing within the tank chamber.

Clause 11. The lid assembly is removable from the recovery tank with the float attached thereto with the inlet stack and the outlet stack remaining in the recovery tank.

Clause 12. The extraction cleaner has a suction source for generating a working air stream and a fluid source for supplying fluid to a surface to be cleaned. The air/liquid separation system includes a recovery tank assembly with a recovery tank, an inlet stack for receiving the working air stream with extracted liquid and debris entrained therein, an outlet stack for expelling air separated from the working air stream, and a lid assembly. The recovery tank defines a tank chamber with a top opening. The recovery tank has a bottom wall and a plurality of side walls that extend upward from the bottom wall to the top opening and define the top opening. The lid assembly is configured to sealingly close the top opening. The bottom wall has an inlet opening for receiving the working air stream and an outlet opening. The inlet stack extends upward from the inlet opening and the outlet stack extends upward from the outlet opening. The lid assembly defines a lid chamber with a first lid chamber opening that is in selective fluid communication with the tank chamber and serves as a tank chamber air outlet and a second lid chamber opening at an inlet of the outlet stack. A bottom of the lid assembly defines an open bottom cavity within the tank chamber and above an outlet of the inlet stack. A lower surface of the lid assembly at the open bottom cavity inclines upward and outward from above the outlet of the inlet stack to an outermost side wall of the lid assembly to deflect fluid and dirt entrained in the working air stream away from the outlet of the inlet stack.

Clause 13. The lid assembly includes a pair of downwardly-extending guide rails spaced apart from and not connected to one another with the first lid chamber opening disposed between the guide rails. The guide rails include slots that extend therethrough. The air/liquid separation system further includes a float disposed within the tank chamber and operatively attached to and vertically translatable relative to the lid assembly to close the first lid chamber opening when liquid in the tank chamber reaches a predetermined level. The float includes side extensions that extend through the slots, with the float translatable along the guide rails at the slots.

Clause 14. The lid assembly has a bottom wall that extends parallel to the bottom wall of the recovery tank. The first lid chamber opening is in the bottom wall of the lid assembly.

Clause 15. The lid assembly includes an outlet stack connector that extends downward into the tank chamber at the second lid chamber opening and is configured to sealingly engage the inlet of the outlet stack.

Clause 16. The outlet stack connector extends downward to a lower-most portion of the open bottom cavity.

Clause 17. The lid assembly includes a downwardly-extending guide flange configured to at least partially surround the outlet stack.

Clause 18. The lid assembly includes a bottom lid portion and a top lid portion secured to one another. The bottom lid portion includes an upwardly-extending wall that extends across the bottom lid portion. The bottom lid portion, the top lid portion, and the upwardly-extending wall bound the lid chamber.

Clause 19. An exterior of the inlet stack is spaced apart from and not connected to an exterior of the outlet stack such that the inlet stack is free-standing within the tank chamber.

Clause 20. The lid assembly is removable from the recovery tank with the inlet stack and the outlet stack remaining in the recovery tank.

To assist and clarify the description of various embodiments, various terms are defined herein. Unless otherwise indicated, the following definitions apply throughout this specification (including the claims). Additionally, all references referred to are incorporated herein in their entirety.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An air/liquid separation system for an extraction cleaner, the extraction cleaner having a suction source for generating a working air stream and a fluid source for supplying a cleaning fluid to a surface to be cleaned, the air/liquid separation system comprising:

a recovery tank assembly including a recovery tank defining a tank chamber with a top opening, the recovery tank including a bottom wall, a curvilinear exterior side wall extending upward from the bottom wall to the top opening, and a relatively planar interior side wall extending upward from the bottom wall to the top opening and connected to the curvilinear exterior side wall, the relatively planar interior side wall and the curvilinear exterior side wall together surround the tank chamber and define the top opening, wherein the bottom wall has an inlet opening and an outlet opening, the inlet opening receives said working air stream;

an inlet stack for receiving said working air stream with extracted liquid and debris entrained therein;

an outlet stack for expelling air separated from said working air stream, wherein the inlet stack extends upward from the inlet opening and the outlet stack extends upward from the outlet opening;

a lid assembly that defines a lid chamber having a first lid chamber opening in selective fluid communication with the tank chamber and serving as a tank chamber air outlet and a second lid chamber opening at an inlet of the outlet stack, wherein an outer perimeter of the lid assembly follows and seals to the curvilinear exterior side wall and to the relatively planar interior side wall at a top of the recovery tank to enclose the top opening of the recovery tank; and a float disposed within the tank chamber and operatively attached to and vertically translatable relative to the lid assembly to close the first lid chamber opening when liquid in the tank chamber reaches a predetermined level, wherein the float is disposed adjacent to the curvilinear exterior side wall, and the inlet stack and outlet stack are disposed transversely side-by-side in the tank chamber with the outlet stack between the float and the inlet stack.

2. The air/liquid separation system of claim 1, wherein the lid assembly includes a downwardly-extending wall bordering at least a portion of the relatively planar interior side wall and at least a portion of the curvilinear exterior side wall and defining an open bottom cavity within the tank chamber and above an outlet of the inlet stack, and wherein a lower surface of the lid assembly at the open bottom cavity inclines upward and outward from above the outlet of the inlet stack to the downwardly-extending wall at the curvilinear exterior side wall to deflect fluid and dirt entrained in said working air stream away from the outlet of the inlet stack.

3. The air/liquid separation system of claim 2, wherein the lid assembly includes an outlet stack connector extending downward into the tank chamber at the second lid chamber opening, the outlet stack connector configured to sealingly engage the inlet of the outlet stack.

4. The air/liquid separation system of claim 3, wherein a lower surface of the lid assembly inclines upward and outward from above the outlet of the inlet stack toward the curvilinear exterior side wall to deflect fluid and dirt entrained in said working air stream away from the outlet of the inlet stack, and wherein the outlet stack connector extends downward to a lower-most portion of the lower surface.

5. The air/liquid separation system of claim 1, wherein the float has a curvilinear exterior side adjacent to and following a contour of the curvilinear exterior side wall of the recovery tank.

6. The air/liquid separation system of claim 1, wherein the first lid chamber opening has an arcuate shape following a contour of the curvilinear exterior side wall.

7. The air/liquid separation system of claim 1, wherein the lid assembly includes a pair of downwardly-extending guide rails spaced apart from one another with the first lid chamber opening disposed between the guide rails, the guide rails including slots extending therethrough, and wherein the float includes side extensions that extend through the slots, with the float translatable along the guide rails at the slots.

8. The air/liquid separation system of claim 1, wherein the lid assembly includes a downwardly-extending guide flange configured to at least partially surround the outlet stack.

9. The air/liquid separation system of claim 1, wherein the lid assembly includes a bottom lid portion and a top lid portion secured to one another, the bottom lid portion including an upwardly-extending perimeter wall bordered by the outer perimeter of the lid assembly and an upwardly-extending inner wall, the upwardly-extending inner wall connecting the upwardly-extending perimeter wall at the relatively planar interior side wall of the recovery tank to the upwardly-extending perimeter wall at the curvilinear exterior side wall of the recovery tank, and the bottom lid portion, the top lid portion, and the upwardly-extending inner wall bounding the lid chamber.

10. The air/liquid separation system of claim 1, wherein an exterior of the inlet stack is spaced apart from and not connected to an exterior of the outlet stack such that the inlet stack is free-standing within the tank chamber.

11. The air/liquid separation system of claim 1, wherein the lid assembly is removable from the recovery tank with the float attached to the lid assembly and with the inlet stack and the outlet stack remaining in the recovery tank.

12. An air/liquid separation system for an extraction cleaner, the extraction cleaner having a suction source for generating a working air stream and a fluid source for supplying fluid to a surface to be cleaned, the air/liquid separation system comprising:

- a recovery tank assembly including a recovery tank defining a tank chamber with a top opening, the recovery tank having a bottom wall, and a plurality of side walls extending upward from the bottom wall to the top opening and defining the top opening,
- an inlet stack for receiving said working air stream with extracted liquid and debris entrained therein;
- an outlet stack for expelling air separated from said working air stream, wherein the bottom wall has an inlet opening for receiving said working air stream and an outlet opening, the inlet stack extending upward from the inlet opening and the outlet stack extending upward from the outlet opening;
- a lid assembly configured to sealingly close the top opening; and
- a lid chamber defined by the lid assembly, the lid chamber having a first lid chamber opening in selective fluid communication with the tank chamber and serving as a tank chamber air outlet and a second lid chamber opening at an inlet of the outlet stack, wherein a bottom of the lid assembly defines an open bottom cavity within the tank chamber and above an outlet of the inlet stack, and wherein a lower surface of the lid assembly at the open bottom cavity inclines upward and outward from above the outlet of the inlet stack to an outermost side wall of the lid assembly to deflect fluid and dirt entrained in the working air stream away from the outlet of the inlet stack.

13. The air/liquid separation system of claim 12, further comprising:

- a pair of downwardly-extending guide rails spaced apart from one another with the first lid chamber opening disposed between the guide rails, the guide rails including slots extending therethrough; and
- a float disposed within the tank chamber and operatively attached to and vertically translatable relative to the lid assembly to close the first lid chamber opening when liquid in the tank chamber reaches a predetermined level, wherein the float includes side extensions that extend through the slots, with the float translatable along the guide rails at the slots.

14. The air/liquid separation system of claim 12, wherein the lid assembly has a bottom wall extending parallel to the bottom wall of the recovery tank, and wherein the first lid chamber opening is in the bottom wall of the lid assembly.

15. The air/liquid separation system of claim 12, wherein the lid assembly includes an outlet stack connector extending downward into the tank chamber at the second lid chamber opening, the outlet stack connector configured to sealingly engage the inlet of the outlet stack.

16. The air/liquid separation system of claim 15, wherein the outlet stack connector extends downward to a lowermost portion of the open bottom cavity.

17. The air/liquid separation system of claim 12, wherein the lid assembly includes a downwardly-extending guide flange configured to at least partially surround the outlet stack.

18. The air/liquid separation system of claim 12, wherein the lid assembly includes a bottom lid portion and a top lid portion secured to one another, the bottom lid portion including an upwardly-extending wall that extends across the bottom lid portion, and wherein the bottom lid portion, the top lid portion, and the upwardly-extending wall bound the lid chamber.

19. The air/liquid separation system of claim 12, wherein an exterior of the inlet stack is spaced apart from an exterior of the outlet stack such that the inlet stack is free-standing within the tank chamber.

20. The air/liquid separation system of claim 12, wherein the lid assembly is removable from the recovery tank with the inlet stack and the outlet stack remaining in the recovery tank.

* * * * *